(12) United States Patent
Kim et al.

(10) Patent No.: US 9,634,816 B2
(45) Date of Patent: Apr. 25, 2017

(54) METHOD AND APPARATUS FOR TRANSMITTING AND RECEIVING DATA

(71) Applicant: LG ELECTRONICS INC., Seoul (KR)

(72) Inventors: Bonghoe Kim, Seoul (KR); Dongyoun Seo, Seoul (KR); Daesung Hwang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 102 days.

(21) Appl. No.: 14/421,107

(22) PCT Filed: Sep. 4, 2013

(86) PCT No.: PCT/KR2013/007987
§ 371 (c)(1),
(2) Date: Feb. 11, 2015

(87) PCT Pub. No.: WO2014/038852
PCT Pub. Date: Mar. 13, 2014

(65) Prior Publication Data
US 2015/0200762 A1 Jul. 16, 2015

Related U.S. Application Data

(60) Provisional application No. 61/698,721, filed on Sep. 9, 2012, provisional application No. 61/703,783, filed on Sep. 21, 2012.

(51) Int. Cl.
*H04W 4/00* (2009.01)
*H04L 5/00* (2006.01)
(Continued)

(52) U.S. Cl.
CPC .......... *H04L 5/0055* (2013.01); *H04L 1/0027* (2013.01); *H04L 1/16* (2013.01);
(Continued)

(58) Field of Classification Search
CPC combination set(s) only.
See application file for complete search history.

(56) References Cited

U.S. PATENT DOCUMENTS 8,724,504 B2    5/2014  Gao et al.
8,837,450 B2    9/2014  Papasakellariou et al.
(Continued)

FOREIGN PATENT DOCUMENTS

KR    10-2011-0088556    8/2011
KR    10-2012-0089861    8/2012
(Continued)

OTHER PUBLICATIONS

CATT, UL ACK/NACK transmission methods for LTE-A, 3GPP TSG RAN WG1 Meeting #60bis, 8 pages, Apr. 2010.*
(Continued)

*Primary Examiner* — Frank Duong
(74) *Attorney, Agent, or Firm* — Lee Hong Degerman Kang Waimey

(57) ABSTRACT

Disclosed are a method and an apparatus for transmitting and receiving data. A method for transmitting an uplink comprises the steps of: a terminal receiving first downlink data from a first cell through a first subframe; the terminal receiving second downlink data from a second cell through the first subframe; the terminal transmitting first uplink data, which is generated based on a first identifier of the first cell, as a reply to the first downlink data through a second subframe, and the terminal transmitting second uplink data, which is generated based on a second identifier of a second cell, as a reply to the second downlink data through the second subframe.

12 Claims, 27 Drawing Sheets

(51) Int. Cl.
| | |
|---|---|
| H04L 1/18 | (2006.01) |
| H04L 1/16 | (2006.01) |
| H04L 5/14 | (2006.01) |
| H04W 72/04 | (2009.01) |
| H04W 52/14 | (2009.01) |
| H04W 52/32 | (2009.01) |
| H04L 1/00 | (2006.01) |
| H04W 52/10 | (2009.01) |
| H04W 52/24 | (2009.01) |

(52) U.S. Cl.
CPC .......... *H04L 1/1861* (2013.01); *H04L 1/1867* (2013.01); *H04L 5/14* (2013.01); *H04W 52/146* (2013.01); *H04W 52/322* (2013.01); *H04W 72/042* (2013.01); *H04W 72/0413* (2013.01); *H04L 1/0025* (2013.01); *H04L 1/0026* (2013.01); *H04L 5/001* (2013.01); *H04L 5/0057* (2013.01); *H04L 5/1469* (2013.01); *H04W 52/10* (2013.01); *H04W 52/245* (2013.01)

(56) References Cited

U.S. PATENT DOCUMENTS

| | | | |
|---|---|---|---|
| 2011/0077038 A1* | 3/2011 | Montojo | H04B 7/024 455/507 |
| 2011/0098074 A1 | 4/2011 | Seo et al. | |
| 2011/0261714 A1* | 10/2011 | Pan | H04L 5/001 370/252 |
| 2012/0009963 A1 | 1/2012 | Kim et al. | |
| 2012/0034927 A1 | 2/2012 | Papasakellariou et al. | |
| 2012/0039280 A1 | 2/2012 | Chen et al. | |
| 2012/0099547 A1 | 4/2012 | Wan et al. | |
| 2013/0223300 A1* | 8/2013 | Yang | H04L 1/1861 370/280 |

FOREIGN PATENT DOCUMENTS

| | | |
|---|---|---|
| WO | 2011/085230 | 7/2011 |
| WO | 2011/137444 | 11/2011 |

OTHER PUBLICATIONS

PCT International Application No. PCT/KR2013/007987, Written Opinion of the International Searching Authority dated Dec. 6, 2013, 1 page.
European Patent Office Application No. 13836116.7, Search Report dated Apr. 11, 2016, 8 pages.
Huawei, "DL/UL Asymmetric Carrier Aggregation" 3GPP TSG-RAN-WG1 #54bis, R1-083706, Sep. 29-Oct. 3, 2008, 4 pages.
U.S. Appl. No. 14/419,621, Office Action dated Mar. 29, 2016, 11 pages.
Alcatel-Lucent Shanghai Bell et al., "Triggering of Aperiodic CSI with Carrier Aggregation", 3GPP TSG RAN WG1 Meeting #63, R1-105987, Nov. 9, 2010, 6 pages.
LG Electronics, "Draft CR for correction on nHARQ equation for TDD with PUCCH format 3", 3GPP TSG-RAN WG1 Meeting #66, R1-112324, Aug. 16, 2011, 3 pages.
European Patent Application No. 13836116.7, Search report dated Aug. 5, 2016, 18 pages.
European Patent Application No. 13836163.9, Search report dated Sep. 23, 2016, 11 pages.

* cited by examiner

METHOD AND APPARATUS FOR TRANSMITTING AND RECEIVING DATA

CROSS-REFERENCE TO RELATED APPLICATIONS

This application is the National Stage filing under 35 U.S.C. 371 of International Application No. PCT/KR2013/007987, filed on Sep. 4, 2013, which claims the benefit of U.S. Provisional Application Ser. No. 61/698,721, filed on Sep. 9, 2012, and 61/703,783, filed on Sep. 21, 2012, the contents of which are all hereby incorporated by reference herein in their entirety.

FIELD OF THE INVENTION

The present invention relates to wireless communications, and more specifically, a method and apparatus for transmitting and receiving data.

RELATED ART

3GPP (3rd Generation Partnership Project) TS (Technical Specification) Release 8-based LTE (long term evolution) is a key next-generation communication standard.

As set forth in 3GPP TS 36.211 V8.7.0 (2009-05) "Evolved Universal Terrestrial Radio Access (E-UTRA); Physical Channels and Modulation (Release 8),", physical channels in LTE systems may be divided into downlink channels such as PDSCH (Physical Downlink Shared Channel) and PDCCH (Physical Downlink Control Channel) and uplink channels such as PUSCH (Physical Uplink Shared Channel) and PUCCH (Physical Uplink Control Channel).

PUCCH is an uplink control channel used for transmitting uplink control information including HARQ (hybrid automatic repeat request), ACK/NACK signals, CQI (Channel Quality Indicator), or SR (scheduling request).

Meanwhile, 3GPP LTE-A (advanced), an evolution version of 3GPP LTE, is being developed. 3GPP LTE-A systems adopt carrier aggregation and MIMO (multiple input multiple output) supportive of four or more antenna ports.

Carrier aggregation uses multiple component carriers. Each component carrier is defined with a center frequency and a bandwidth. One downlink component carrier or a pair of uplink component carrier and downlink component carrier corresponds to one cell. If a UE receives a service using a plurality of downlink CCs, the UE may be said to receive the service from a plurality of serving cells.

TDD (time division duplex) systems use the same frequency for downlink and uplink. Accordingly, an uplink sub-frame is associated with one or more downlink sub-frames. The term "association" means that transmission/reception in a downlink sub-frame are associated with transmission/reception in an uplink sub-frame. For example, when receiving transport blocks in a plurality of sub-frames, the UE transmits HARQs or ACKs/NACKs for the transport blocks in an uplink sub-frame associated with the plurality of downlink sub-frames.

SUMMARY OF THE INVENTION

An object of the present invention is to provide a method for transmitting data.

Another object of the present invention is to provide an apparatus for transmitting data.

To achieve the above objects of the present invention, according to an aspect of the present invention, an uplink transmission method may comprise receiving first downlink data from a first cell through a first sub-frame by a user equipment (UE), receiving second downlink data from a second cell through the first sub-frame by the UE, transmitting, through a second sub-frame, first uplink data generated based on a first identifier for the first cell in response to the first downlink data by the UE, and transmitting, through the second sub-frame, second uplink data generated based on a second identifier for the second cell in response to the second downlink data by the UE.

To achieve the above objects of the present invention, according to an aspect of the present invention, a user equipment (UE) in a wireless communication system may comprise a radio frequency (RF) unit receiving a radio signal and a processor selectively connected with the RF unit, wherein the processor may be implemented to receive first downlink data from a first cell through a first sub-frame, receive second downlink data from a second cell through the first sub-frame, transmit, through a second sub-frame, first uplink data generated based on a first identifier for the first cell in response to the first downlink data, and transmit, through the second sub-frame, second uplink data generated based on a second identifier for the second cell in response to the second downlink data.

transmit powerData transmission efficiency may be increased.

DESCRIPTION OF EXEMPLARY EMBODIMENTS

A user equipment (UE) may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, a terminal, a wireless terminal, etc.

A base station (BS) is generally a fixed station that communicates with the UE and may be referred to as another terminology, such as an evolved Node-B (eNB), a base transceiver system (BTS), an access point, etc.

Figure 1:
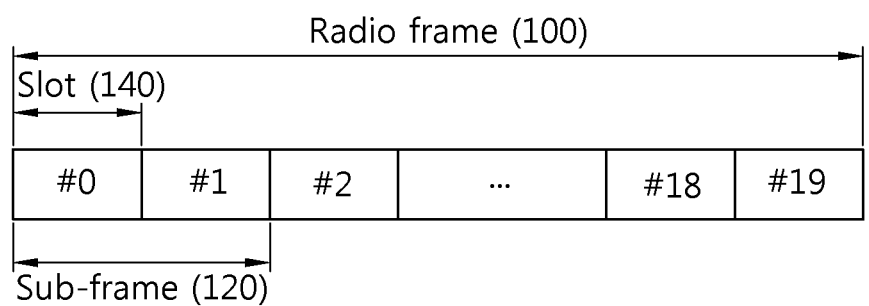
FIG. 1 illustrates the structure of an LTE radio frame.

FIG. 1 shows the structure of a radio frame in 3 GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
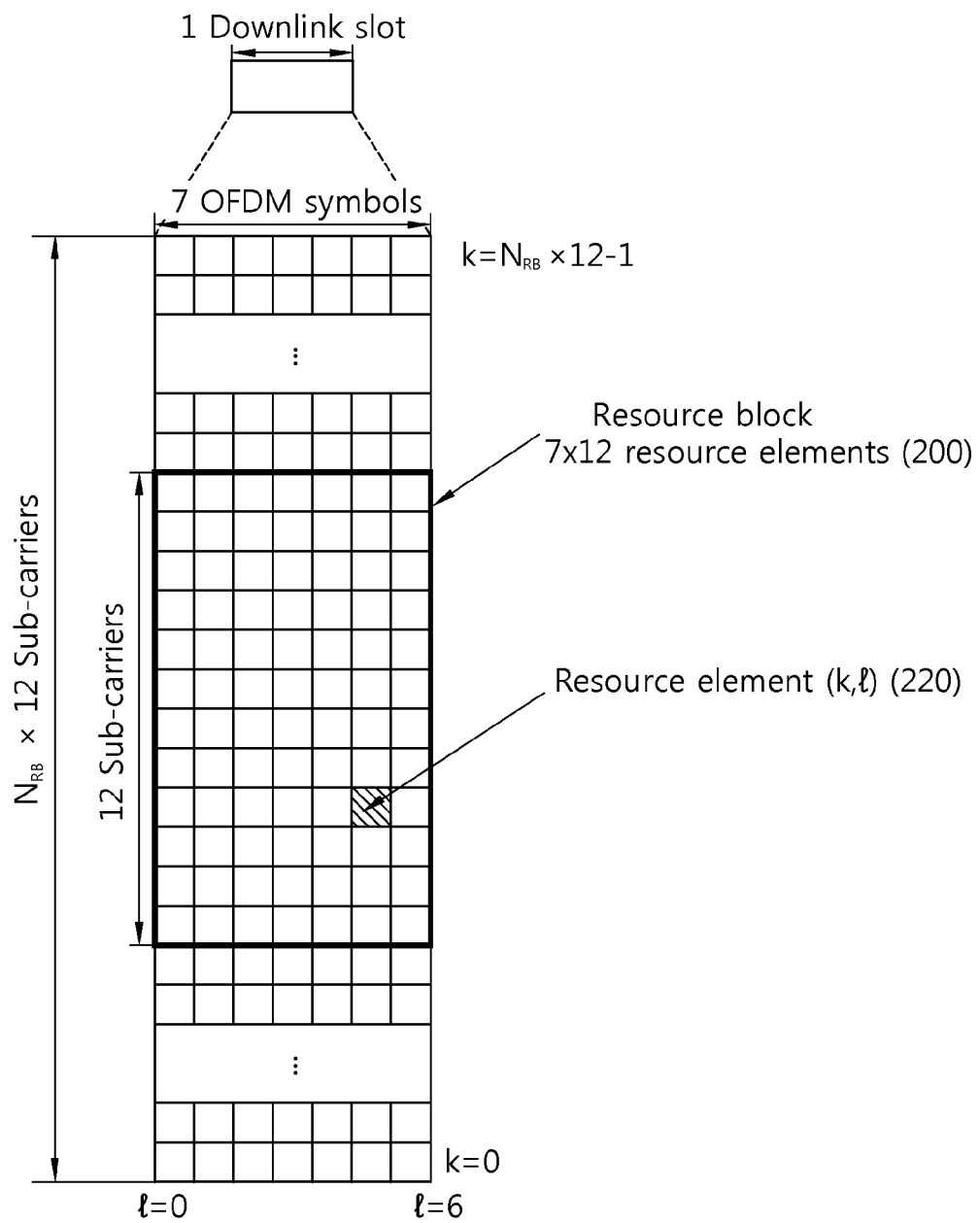
FIG. 2 illustrates an exemplary resource grid for a downlink slot.

FIG. 2 is a view illustrating an example of a resource grid for a downlink slot.

The downlink slot includes multiple OFDM symbols in a time domain, and includes NRB resource blocks in a frequency domain. NRB as a number of a resource block within the downlink slot is determined depending on downlink transmission bandwidth configured at a cell. For example, In a LTE system, NRB may be a value of 6 to 110 according to transmission bandwidth in use. A resource block 200 may include a plurality of subcarriers in the frequency domain. An uplink slot may have a structure same as that of the downlink slot.

Each element on the resource grid is referred to as a resource element 200. The resource element 220 on the resource grid can be identified by an index pair (k, l). Here, k (k=0, . . . , NRB×12-1) is the index of the subcarrier in the frequency domain, and l (l=0, . . . , 6) is the indices of the OFDM symbols in the time domain.

Here, one resource block 200 may include 7 OFDM symbols in the time domain and 7×12 resource elements 220 composed of 12 subcarriers in the frequency domain. Such size is just an example, and it is possible that the number of subcarriers and OFDM symbols constructing one resource block 200 varies. The resource block pair indicates a resource unit including two resource blocks.

The number of the OFDM symbols included in one slot may vary depending on CP as mentioned above. In addition, the number of the resource block included in one slot may vary according to the size of the entire frequency bandwidth.

Figure 3:
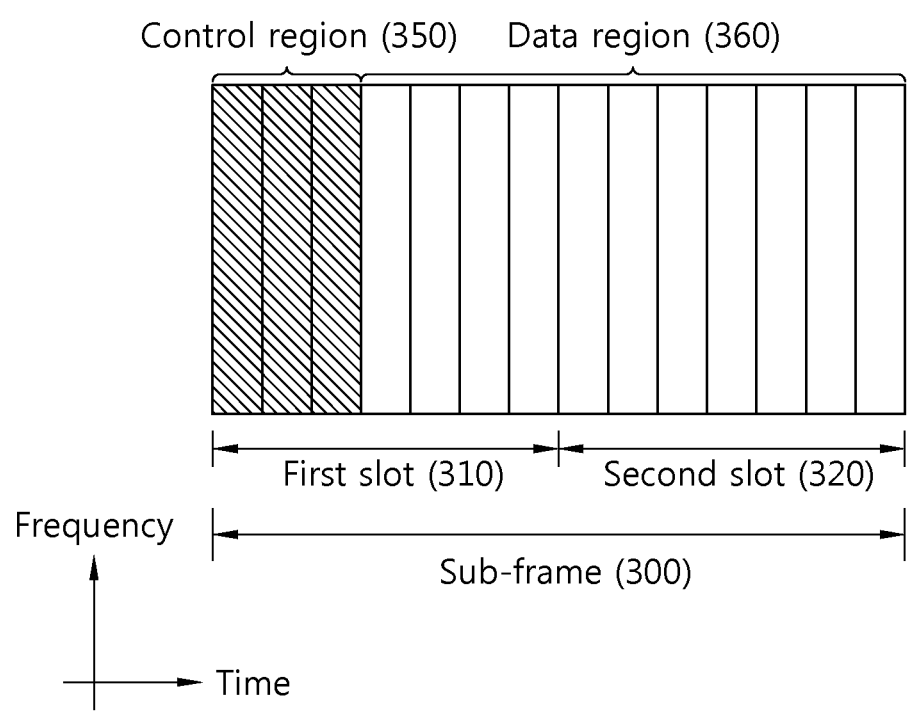
FIG. 3 illustrates the structure of a downlink sub-frame.

FIG. 3 is a view illustrating the structure of a downlink subframe.

The downlink subframe may be identified by two slots 310, 320 based on time. Each slot 310 or 320 includes 7 OFDM symbols in a normal CP. A resource region corresponding to 3 OFDM symbols (maximum 4 OFDM symbols for 1.4 MHz bandwidth), which arrive first, in the first slot may be used as a control region 350. Remaining OFDM symbols may be used as a data region 360 to which a traffic channel such as a physical downlink shared channel (PDSCH) is assigned.

PDCCH, for example, may be the control channel for transmitting information on resource allocation and a transmit format in a downlink-shared channel (DL-SCH), uplink shared channel (UL-SCH) resource allocation, information on paging on PCH, information on a system on the DL-SCH, and information on resource allocation for upper layer control messages such as random access response over the PDSCH, a transmit power control command set for individual UEs within a random UE group and voice over internet protocol (VoIP) activation. Multiple units for transmitting PDCCH data may be defined within the control region 350. A UE may monitor a plurality of units for transmitting PDCCH data to obtain control data. For example, PDCCH data may be transmitted to the UE based on an aggregation of one or more continuous control channel elements (CCE). The CCE may be one unit for transmitting PDCCH data. The CCE may include a plurality of resource element groups. The resource element group is a resource unit including available 4 resource elements.

A base station determines a PDCCH format based on downlink control information (DCI), and attaches a cyclic redundancy check (CRC) to the control information. The CRC is masked with a unique identifier (referred to as a radio network temporary identifier (RNTI)) according to an owner or a usage. If PDCCH is for a specific UE, a unique identifier of the UE, e.g., C-RNTI (cell-RNTI), may be masked to the CRC. IF PDCCH is for a paging message, an identifier indicating paging, e.g., P-RNTI (paging-RNTI), may be masked to the CRC. If PDCCH is for a system information block (SIB), a system information-RNTI (SI-RNTI)) may be masked to the CRC. In order to indicate random access response as response for a random access preamble of a UE, a random access-RNTI may be masked to the CRC.

Figure 4:
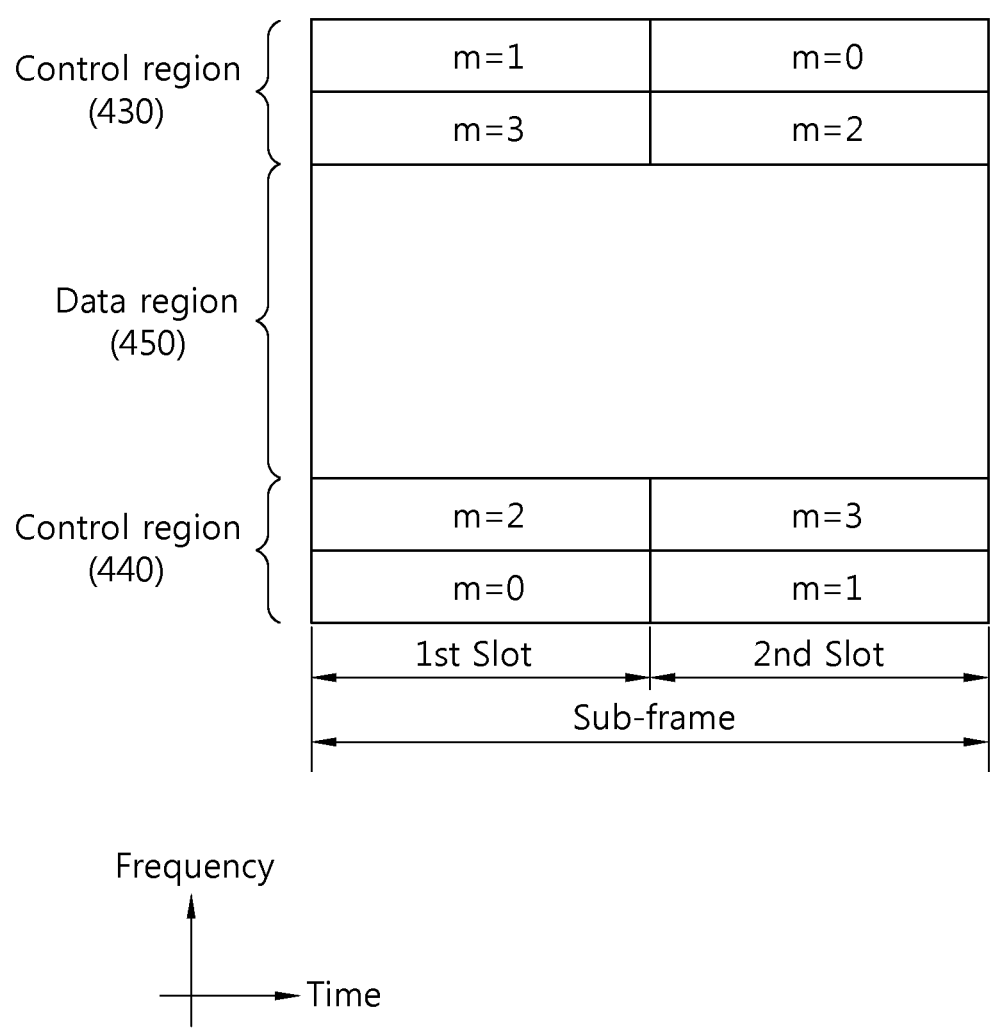
FIG. 4 illustrates the structure of a 3GPP LTE TDD mode downlink radio frame.

FIG. 4 shows a downlink radio frame structure in TDD mode.

For the downlink radio frame structure in TDD mode, the section 4 of 3GPP TS 36.211 V8.7.0 (May 2009) "Evolved Universal Terrestrial Radio Access (E-UTRA); Physical Channels and Modulation (Release 8)" may be referred and the downlink radio frame structure in TDD mode is related to a time division duplex (TDD).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and downlink.

In TDD, a downlink (DL) subframe and an uplink (UL) subframe co-exist in one radio frame. Table 1 shows an example of a configuration of the radio frame.

TABLE 1

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'ID' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

The PCFICH transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Figure 5:
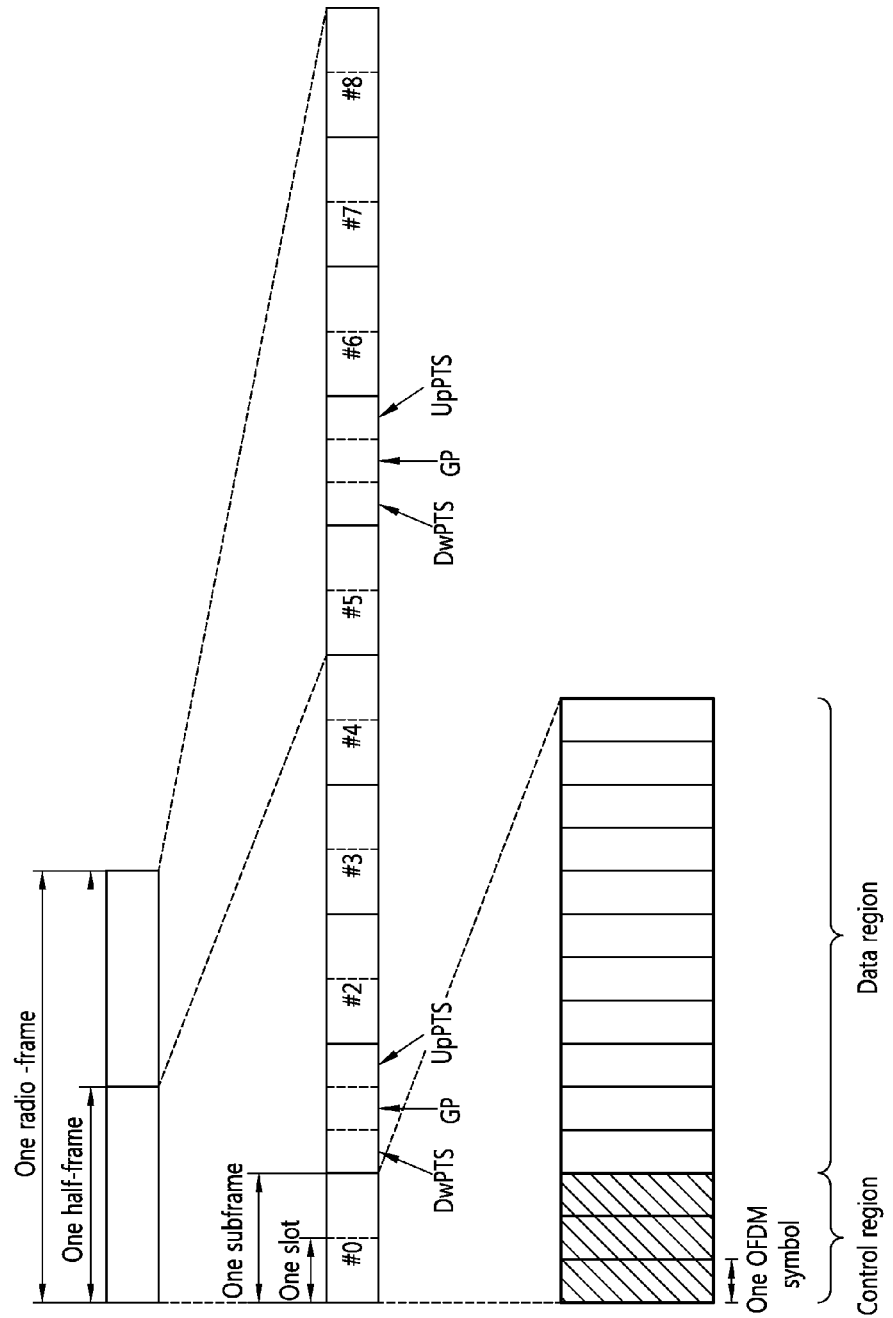
FIG. 5 illustrates the structure of a 3GPP LTE uplink sub-frame.

FIG. 5 is a view illustrating the structure of an uplink subframe in 3GPP LTE.

The uplink subframe may be divided into a control region allocated to a physical uplink control channel (PUCCH) for delivering uplink control information and a data region allocated to a physical uplink shared channel (PUSCH) for delivering user data. PUCCH resources for allocation may be located at the edge of bandwidth of a component carrier (CC).

The PUCCH may be allocated based on a RB pair in the subframe. RBs corresponding to the RB pair may be allocated to different subcarriers in a first and a second slots respectively. m is a position index indicating the position of a logical frequency domain of the RB pair which is allocated to the PUCCH in the subframe. RBs having the same value of m are allocated to different subcarriers of the first and second slots.

According to 3GPP TS 36.211 V8.7.0, the PUCCH may have various formats. It is possible to use Different PUCCH formats with different bit numbers in the subframe according to a modulation scheme for use in the PUCCH format.

Table 2 shows an example of bit numbers per subframe and the modulation scheme according to the PUCCH format.

TABLE 2

| PUCCH format | Modulation scheme | bit number per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

PUCCH format 1 for scheduling request (SR) transmission, PUCCH format 1a/1b for transmitting an ACK/NACK signal for HARQ, PUCCH format 2 for CQI transmission, and PUCCH format 2a/2b for simultaneous transmission of the CQI and the ACK/NACK signals are used. When only the ACK/NACK signal is transmitted in the subframe, PUCCH format 1a/1b is used, and when only the SR is transmitted, PUCCH format 1 is used. When the SR and the ACK/NACK signal are transmitted simultaneously, PUCCH format 1 is used, and the ACK/NACK signal is transmitted after being modulated to resources allocated to the SR.

The entire PUCCH formats use cyclic shift (CS) of a sequence for each OFDM symbol. A base sequence is cyclically shifted by specific CS amount to generate a cyclic shift sequence. The specific CS amount is indicated by a CS index.

The sequence length is equal to the number of an element included in the sequence. The sequence index for indicating the sequence may be determined based on a cell identifier, a slot number within a radio frame, and the like. Assuming that a base sequence is mapped to one resource block in the frequency domain, one resource block includes 12 subcarriers, and thus the length of the base sequence N is 12. The cyclic shift sequence may be generated by cyclically shifting the base sequence.

The available cyclic shift index to the base sequence may be induced from the base sequence based on a CS interval. For example, when the base sequence length is 12 and the CS interval is 2, total number of the available cyclic shift indices to the base sequence is 6. Hereinafter, HARQ ACK/NACK signal transmission in PUCCH format 1b will be described.

Figure 6:
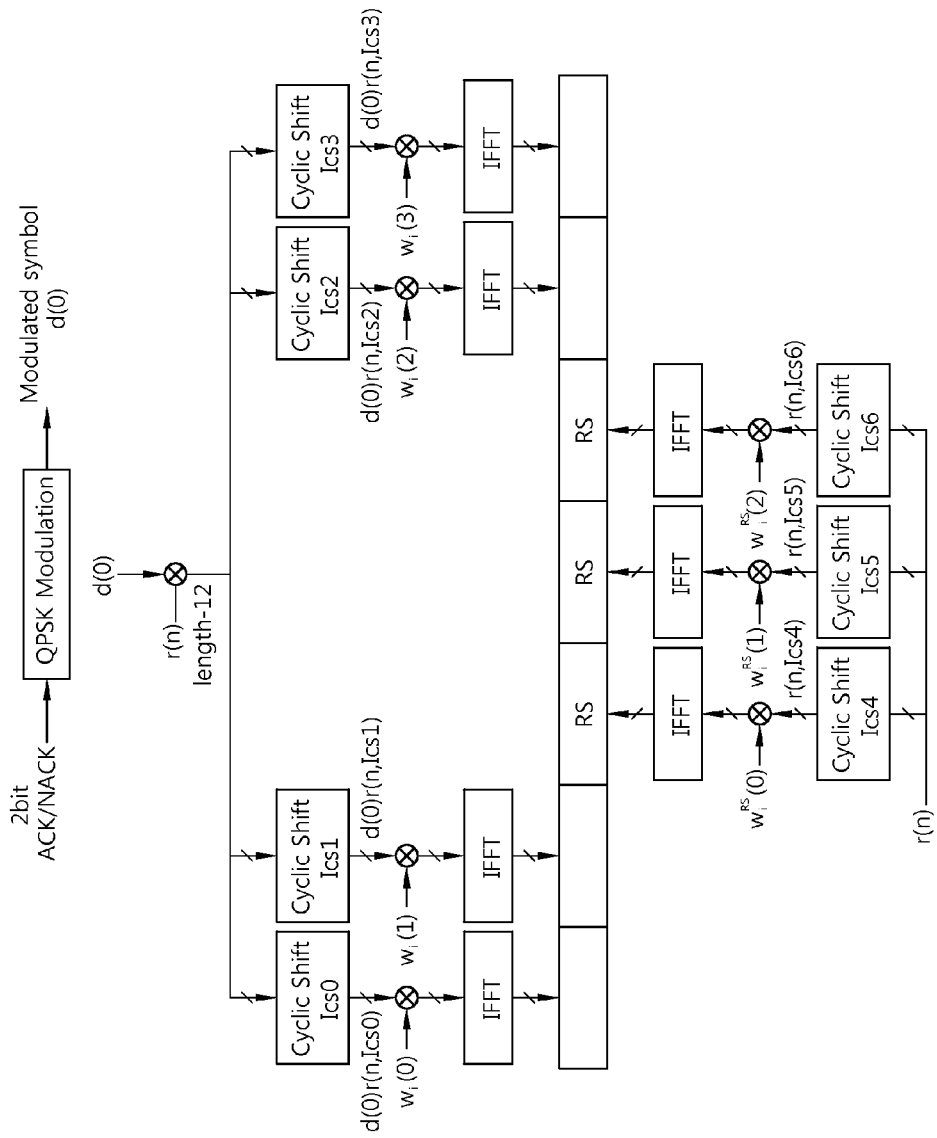
FIG. 6 illustrates PUCCH format 1b in 3GPP LTE normal CP.

FIG. 6 illustrates normal CP PUCCH format 1b in 3GPP LTE.

One slot includes seven OFDM symbols, three of which are RS OFDM symbols for reference signal and the other four are data OFDM symbols for ACK/NACK signal.

In PUCCH format 1b, an encoded two-bit ACK/NACK signal is QPSK (Quadrature Phase Shift Keying) modulated to generate a modulated symbol d(0).

A cyclic shift index $I_{cs}$ may vary depending on slot numbers ($n_s$) in the radio frame and/or symbol indexes in the slot.

In normal CP one slot includes four OFDM symbols for transmission of an ACK/NACK signal. Thus, assume that a corresponding cyclic shift index in each data OFDM symbol is $I_{CS0}$, $I_{CS1}$, $I_{CS2}$, $I_{CS3}$.

The modulated symbol d(0) is spread into a cyclic-shifted sequence r(n, $I_{cs}$). Assuming that a one-dimensional spread sequence corresponding to the (i+1)th OFDM symbol in the slot is m(i), it may be represented as $$\{m(0),m(1),m(2),m(3)\}=\{d(0)r(n,I_{cs0}),d(0)r(n,I_{cs1}),d(0)r(n,I_{cs2}),d(0)r(n,I_{cs3})\}.$$

For the UE's increased capability, the one-dimensional spread sequence may be spread using an orthogonal sequence. As the orthogonal sequence with a spreading factor (K)=4, $w_i(k)$ (i is a sequence index, 0≤k≤K−1), the following comes in use.

TABLE 3

| index | [$w_i(0)$, $w_i(1)$, $w_i(2)$, $w_i(3)$] |
|---|---|
| 0 | [+1 +1 +1 +1] |
| 1 | [+1 −1 +1 −1] |
| 2 | [+1 −1 −1 +1] |

As the orthogonal sequence with a spreading factor (K)=3, $w_i(k)$ (i is a sequence index, 0≤k≤K−1), the following sequence is used.

TABLE 4

| index | [$w_i(0)$, $w_i(1)$, $w_i(2)$] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

A different spread coefficient may be used for each slot. Accordingly, given any orthogonal sequence index i, two-dimensional spread sequence {s(0), s(1), s(2), s(3)} may be represented as follows:

$$\{s(0),s(1),s(2),s(3)\}=\{w_i(0)m(0),w_i(1)m(1),w_i(2)m(2),w_i(3)m(3)\}$$

Two-dimensional spread sequences {s(0), s(1), s(2), s(3)} are subjected to IFFT (inverse fast fourier transform) and are then transmitted in their corresponding OFDM symbols. By such method, an ACK/NACK signal may be transmitted on a PUCCH.

For transmission of a PUCCH format 1b reference signal, a reference sequence r(n) is cyclic-shifted and is then spread with an orthogonal sequence. Assuming that a cyclic shift index corresponding to three RS OFDM symbols is $I_{cs4}$, $I_{cs5}$, $I_{cs6}$, three cyclic-shifted sequences r(n,$I_{cs4}$), r(n,$I_{cs5}$), r(n,$I_{cs6}$) may be acquired. The three cyclic shifted sequences are spread with an orthogonal sequence with K=3, $w_i^{rs}(k)$.

The orthogonal sequence index i, cyclic shift index $I_{cs}$, and resource block index m are parameters for configuring a PUCCH and are resources to distinguish PUCCHs (or UEs). Assuming that the number of available cyclic shifts is 12 and the number of available orthogonal sequence indexes is 3, PUCCHs for a total of 36 UEs may be multiplexed in a single resource block.

In 3GPP LTE, a UE may induce, e.g., the above-described orthogonal sequence index i or cyclic shift index $I_{cs}$ that constitutes a PUCCH by using a resource index $n_{PUCCH}^{(1)}$. The resource index may be defined as equation $n_{PUCCH}^{(1)} = n_{CCE} + n_{PUCCH}^{(1)} \cdot n_{CCE}$ is the number of a first CCE used for transmission of its corresponding DCI (i.e., a downlink resource allocation used for reception of downlink data corresponding to an ACK/NACK signal), and $n_{PUCCH}^{(1)}$ is a parameter provided by the base station to the UE through a higher layer message.

Time, frequency, or code resources used for transmission of ACK/NACK signals are referred to as ACK/NACK resources or PUCCH resources. As described above, the index of an ACK/NACK resource (referred to as an ACK/NACK resource index or PUCCH index) necessary to transmit an ACK/NACK signal on a PUCCH may be represented as at least one of orthogonal sequence index i, cyclic shift index $I_{cs}$, resource block index m, and an index for obtaining the three indexes.

Figure 7:
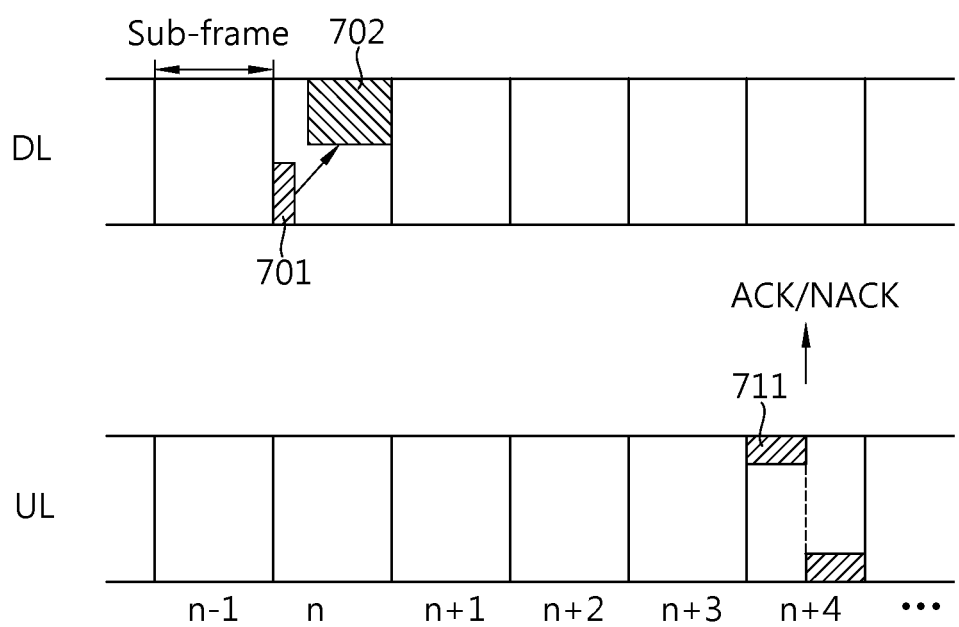
FIG. 7 illustrates an example of performing HARQ.

FIG. 7 illustrates an example of performing an HARQ.

The UE monitors PDCCHs and receives a DL grant including a DL resource allocation on a PDCCH 701 in an nth DL sub-frame. The UE receives a DL transport block through a PDSCH 702 indicated by the DL resource allocation.

The UE transmits an ACK/NACK response to the DL transport block on a PUCCH 711 in an n+4th UL sub-frame. The ACK/NACK response may be an acknowledgement of reception of the DL transport block.

The ACK/NACK signal may be an ACK signal if the DL transport block is successfully decoded or an NACK signal if decoding of the DL transport block fails. The base station, when receiving the NACK signal, may perform re-transmission of a DL transport block until the base station receives an ACK signal or until the transmission reaches a maximum re-transmission count.

In 3GPP LTE, the UE utilizes a resource allocation of the PDCCH 701 in order to configure a resource index for the PUCCH 711. That is, the lowest CCE index (or the index of the first CCE) used for transmission of the PDCCH 701 is $n_{CCE}$, and a resource index is determined as $n_{PUCCH}^{(1)} = n_{CCE} + n_{PUCCH}^{(1)}$.

Now described is a multi-carrier system.

3GPP LTE systems are supportive of configurations in which a downlink bandwidth is different from an uplink bandwidth, which, however, assumes a single component carrier. 3GPP LTE systems may support up to 20 MHz with different bandwidths between uplink and downlink, and the systems are supportive of only one CC for each of uplink and downlink.

Spectrum aggregation (or bandwidth aggregation or carrier aggregation) supports multiple CCs. For example, allocation of five CCs each with a carrier bandwidth granularity of 20 MHz would support a bandwidth up to 100 MHz.

One DL CC (or a pair of downlink CC and uplink CC) may correspond to one cell. Accordingly, a UE communicating with a base station through a plurality of DL CCs may be said to be served from a plurality of serving cells.

LTE-A systems are looking to transmit, through a specific UL (uplink) CC (component carrier), a plurality of ACK/NACK information/signals for a plurality of PDSCHs transmitted through a plurality of DL (downlink) CCs (component carriers). To that end, one idea is, unlike in existing LTE systems in which ACKs/NACKs are transmitted using PUCCH format 1a/1b, to perform channel coding (e.g., Reed-Muller coding or Tail-biting convolutional coding) on a plurality of ACK/NACK information/signals and transmit the plurality of ACK/NACK information/signals using a new PUCCH format (e.g., an E-PUCCH format), a variation PUCCH format based on block-spreading as follows or PUCCH format 2. Now described is a block spreading-based, brand-new PUCCH format variant.

Figure 8:
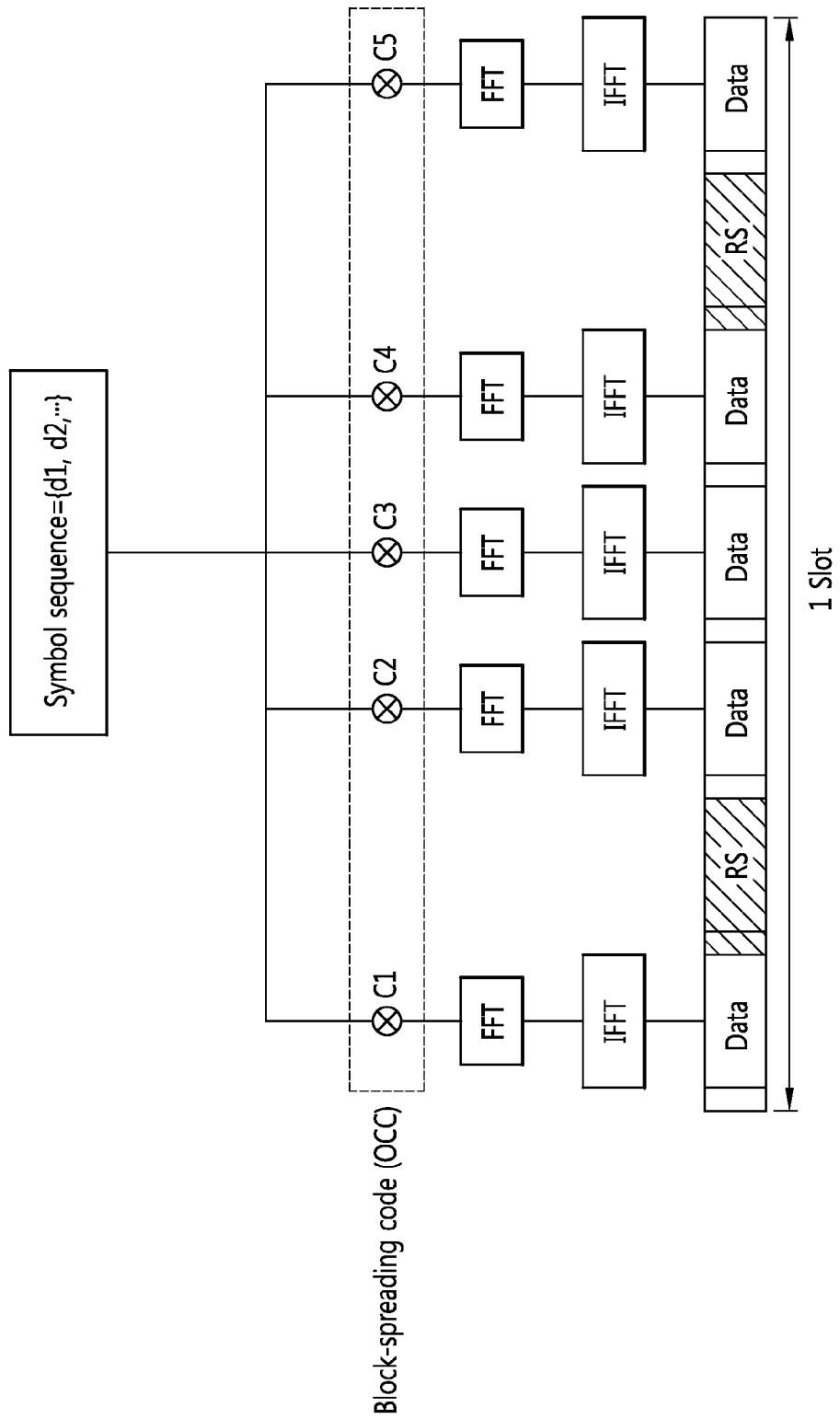
FIG. 8 illustrates a block spreading-based PUCCH format.

FIG. 8 illustrates a block spreading-based PUCCH format.

Block-spreading is a scheme to modulate control information (e.g., ACKs/NACKs) using an SC-FDMA scheme in transmitting the control information unlike that adopted for PUCCH format 1 or PUCCH format 2 in existing LTE systems.

Referring to FIG. 8, a symbol sequence may be spread by an OCC (Orthogonal Cover Code) in the time domain and may be transmitted. Control signals from a number of UEs may be multiplexed in the same RB using the OCC. In existing PUCCH format 2, one symbol sequence is transmitted over the time domain, and multiplexing on a UE is carried out using cyclic shifts of a CAZAC sequence. In the block spreading-based E-PUCCH, however, one symbol sequence is transmitted over the frequency domain, and multiplexing on a UE may be performed using OCC-based time domain spreading.

FIG. 8 illustrates an example in which one symbol sequence is generated into five SC-FDMA symbols through an OCC with length-5 (SF=5) and is then transmitted. Although in FIG. 8 a total of two RS symbols are used during one slot, three RS symbols or an OCC with SF=4 may be used or other various applications may be taken into account. Here, the RS symbols may be generated by a CAZAC sequence having a particular cyclic shift, and the RS symbols may be transmitted, applied (multiplied) with a particular OCC in the time domain.

For ease of description, the channel coding-based scheme for transmitting a plurality of ACKs/NACKs using PUCCH format 2 or E-PUCCH format is denoted a "multi-bit ACK/NACK coding transmission scheme." Multi-bit ACK/NACK coding may be used for transmitting ACK/NACK-coded blocks that are generated by channel-coding ACK/NACK or DTX information (which means failure to receive/detect a PDCCH) for PDSCHs of a plurality of DL CCs.

For example, if a UE operates in SU-MIMO mode to receive two codewords from a downlink CC, the UE may transmit information on a total of four feedback states including ACK/ACK, ACK/NACK, NACK/ACK, and NACK/NACK for each codeword or information on a total of five feedback states further including DTX. If the UE receives a single codeword, the UE may have information on a total of three feedback states including ACK, NACK, and DTX. If NACK and DTX are processed in the same way, the UE may have information on a total of two feedback states including ACK and NACK/DTX. If the UE aggregates up to five downlink CCs and operate in SU-MIMO mode on all the CCs, the UE may have information on a maximum of 55 transmissible feedback states. The size of ACK/NACK payload to represent the information on the 55 transmissible feedback states may be 12 bits in total. If DTX and NACK are processed in the same manner, the number of feedback states is 45, leaving the size of ACK/NACK payload being 10 bits to represent the feedback states.

The ACK/NACK multiplexing (e.g., ACK/NACK selection) method in existing LTE TDD systems basically takes into account an implicit ACK/NACK selection scheme that uses each UE's implicit PUCCH resources corresponding to PDCCHs scheduling PDSCHs in order to secure the UE's PUCCH resources. For example, implicit ACK/NACK selection may be conducted using implicit PUCCH resources linked with the lowest CCE index.

Meanwhile, LTE-A FDD systems are fundamentally looking to transmission of multiple ACKs/NACKs via a single particular uplink CC, which is UE-specifically configured, in response to multiple PDSCHs transmitted through a plurality of downlink CCs. For the purpose, consideration is given to an ACK/NACK selection scheme that utilizes implicit PUCCH resources linked with PDCCHs scheduling a particular one or some or all of the downlink CCs or a combination of the implicit PUCCH resources and explicit PUCCH resources previously reserved for each UE through RRC signaling. For instance, an ACK/NACK may be transmitted using an implicit PUCCH linked with the lowest CCE index nCCE or linked with nCCE and nCCE+1.

Figure 9:
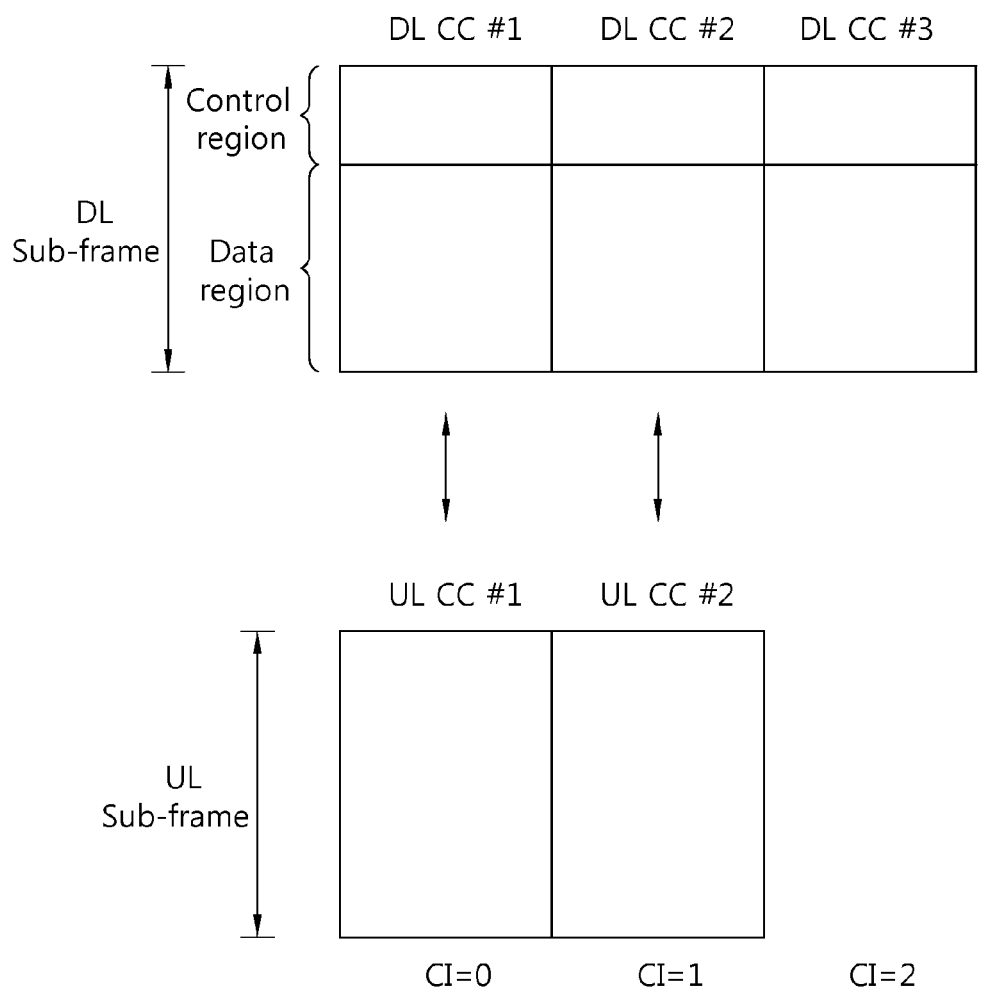
FIG. 9 illustrates an exemplary multi-carrier.

FIG. 9 illustrates an exemplary multi-carrier.

Three DL CCs and three UL CCs are shown, but the number of DL CCs and UL CCs is not limited. A PDCCH and a PDSCH are independently transmitted on each DL CC, and a PUCCH and a PUSCH are independently transmitted on each UL CC. Since three DL CC-UL CC pairs are defined, a UE may be considered to be served from three serving cells.

The UE may monitor the DL CCs and the PDCCHs and the UE may receive DL transport blocks through the plurality of DL CCs. The UE may simultaneously transmit a plurality of UL transport blocks through the plurality of UL CCs.

Assume that a pair of DL CC #1 and UL CC #1 is a first serving cell, a pair of DL CC #2 and UL CC #2 a second serving cell, and DL CC #3 a third serving cell. Each serving cell may be identified through its cell index (CI). The CI may be unique to its corresponding cell or may be UE-specific. In this example, the first to third serving cells are assigned CI=0, 1, and 2.

The serving cells may be divided into a primary cell and secondary cells. The primary cell is a cell that operates at a primary frequency and that establishes the UE's initial connection or initiates a connection reestablishment process or is indicated during a handover process. The primary cell is also denoted a reference cell. Each secondary cell may operate at a secondary frequency and may be configured after an RRC connection has been established. The secondary cells may be used to provide additional radio resources. At least one primary cell is always configured, and secondary cell(s) may be added/modified/released by higher layer signaling. Each secondary cell may be activated by the primary cell.

The CI of the primary cell may be fixed. For example, the lowest CI may be designated as the CI of the primary cell. Hereinafter, the CI of the primary cell is 0, and the CIs of the secondary cells are sequentially assigned 1 and subsequent numbers, for the purpose of description.

Now ACK/NACK transmission for HARQ in 3GPP LTE TDD (Time Division Duplex) is described.

In TDD, unlike FDD (Frequency Division Duplex), DL sub-frames and UL sub-frames coexist in one radio frame. Typically, the number of UL sub-frames is smaller than the number of DL sub-frames. Accordingly, TDD systems back up transmission of a plurality of ACK/NACK signals in one UL sub-frame in response to a plurality of DL transport blocks in preparation for when UL sub-frames for transmitting ACK/NACK signals are insufficient.

Pursuant to 3GPP TS 36.213 V8.7.0 (2009-05), Ch. 10.1, two ACK/NACK modes, channel selection and bundling, are initiated.

First, in the bundling mode, the UE transmits an ACK when successfully decoding all received PDSCHs (i.e., downlink transport blocks), and otherwise, an NACK. This is denoted an AND operation.

However, bundling is not limited to the AND operation, and may rather include various other operations such as compression of ACK/NACK bits corresponding to the plurality of transport blocks (or codewords). For example, bundling may enable indication of the number of ACKs (or NACKs) counted or the number of consecutive ACKs.

Second, channel selection is also referred to as ACK/NACK multiplexing. The UE selects one of a plurality of PUCCH resources to transmit an ACK/NACK.

The following table shows DL sub-frame n-k associated with UL sub-frame n as per UL-DL configurations, where k∈K and M is the number of sets K.

Consider M DL sub-frames are associated in UL sub-frame n and M=4. Since the UE may receive four PDCCHs from four DL sub-frames, the UE may obtain three PUCCH resources ($n_{PUCCH,0}^{(1)}$, $n_{PUCCH,1}^{(1)}$, $n_{PUCCH,2}^{(1)}$, $n_{PUCCH,3}^{(1)}$). When b(0) and b(1) are encoded two-bit ACKs/NACKs, examples of channel selection are as shown in the following table

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

HARQ-ACK(i) is an ACK/NACK for an ith downlink sub-frame among M downlink sub-frames. DTX (Discontinuous Transmission) means that the UE cannot receive a DL transport block on the PDSCH in the DL sub-frame or cannot detect a corresponding PDCCH.

For example, when the UE successfully receives all of the four DL transport blocks in the four DL sub-frames, the UE QPSK-modulates bit (1,1) using $n_{PUCCH,1}^{(1)}$ and transmits an ACK/NACK using PUCCH format 1b in response. If the UE fails to decode the DL transport block in the first (i=1_DL sub-frame and succeeds in decoding on the others, the UE QPSK-modulates bit (0,1) using $n_{PUCCH,3}^{(1)}$ and in response transmits an ACK/NACK using PUCCH format 1b.

Existing PUCCH format 1b may transmit two-bit ACKs/NACKs only. However, channel selection may transmit information on more ACK/NACK states by linking allocated PUCCH resources with actual ACK/NACK signals. Such PUCCH format may be called PUCCH format 1b with channel selection.

TABLE 5

| UL/DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, when M DL sub-frames are associated with UL sub-frame n, an ACK/NACK mismatch between base station and UE may occur due to a missing DL sub-frame (or PDCCH).

Assume that M=4 and that the base station transmits four DL transport blocks through four DL sub-frames. The UE may receive only the first, third, and fourth transport blocks, but not the second transport block, due to the missing PDCCH in the second DL sub-frame. In this case, if bundling comes in use, the UE causes an error of transmitting an ACK.

To address such error, a DAI (Downlink Assignment Index) is included in the DL grant on each PDCCH. The DAI indicates the number of accumulative PDCCHs with assigned PDSCH transmission. A two-bit DAI value is sequentially increased from one, and from DAI=4, modulo-4 computation may apply back. If M=5, and five DL sub-frames are all scheduled, DAIs may be included in their corresponding PDCCHs in order of DAI=1, 2, 3, 4, and 1.

Figure 10:
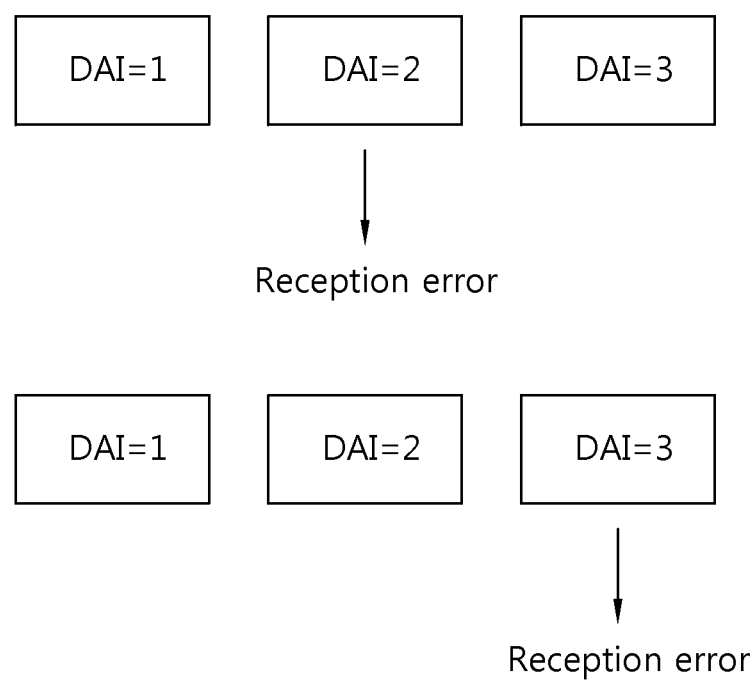
FIG. 10 illustrates examples of error correction using a DAI.

Considering a TDD configuration with DLUL=9:1, modulo-4 computed DAI values may be given as follows:

DAI=1 for a first, fifth, or ninth scheduled PDSCH
DAI=2 for a second or sixth scheduled PDSCH
DAI=3 for a third or seventh scheduled PDSCH
DAI=4 for a fourth or eighth scheduled PDSCH FIG. 10 illustrates examples of error detection using a DAI.

At the upper portion of FIG. 9, the UE cannot receive DAI=2 due to the second DL sub-frame missing. In this case, the UE may be aware that the DL sub-frame corresponding to DAI=2 is missing as the UE receives DAI=3.

At the lower portion of FIG. 9, the UE cannot receive DAI=3 due to the third DL sub-frame missing. In this case, the UE might not be aware that the third DL sub-frame is missing. However, 3GPP LTE enables the base station to be aware of the missing DL sub-frame by configuring a PUCCH based on the first CCE in the last received PDCCH. In other words, the UE transmits an ACK/NACK using a PUCCH resource that is based on the PDCCH resource of the DL sub-frame corresponding to DAI=2. The base station receives the ACK/NACK using the PUCCH resource corresponding to the DL sub-frame with DAI=2, not the DL sub-frame with DAI=3, and the base station may thus be aware that the third DL sub-frame is missing.

Meanwhile, PUCCH format 3 is under discussion in addition to existing 3GPP LTE PUCCH formats in preparation for insufficient ACK/NACK bits due to use of a plurality of serving cells.

Figure 11:
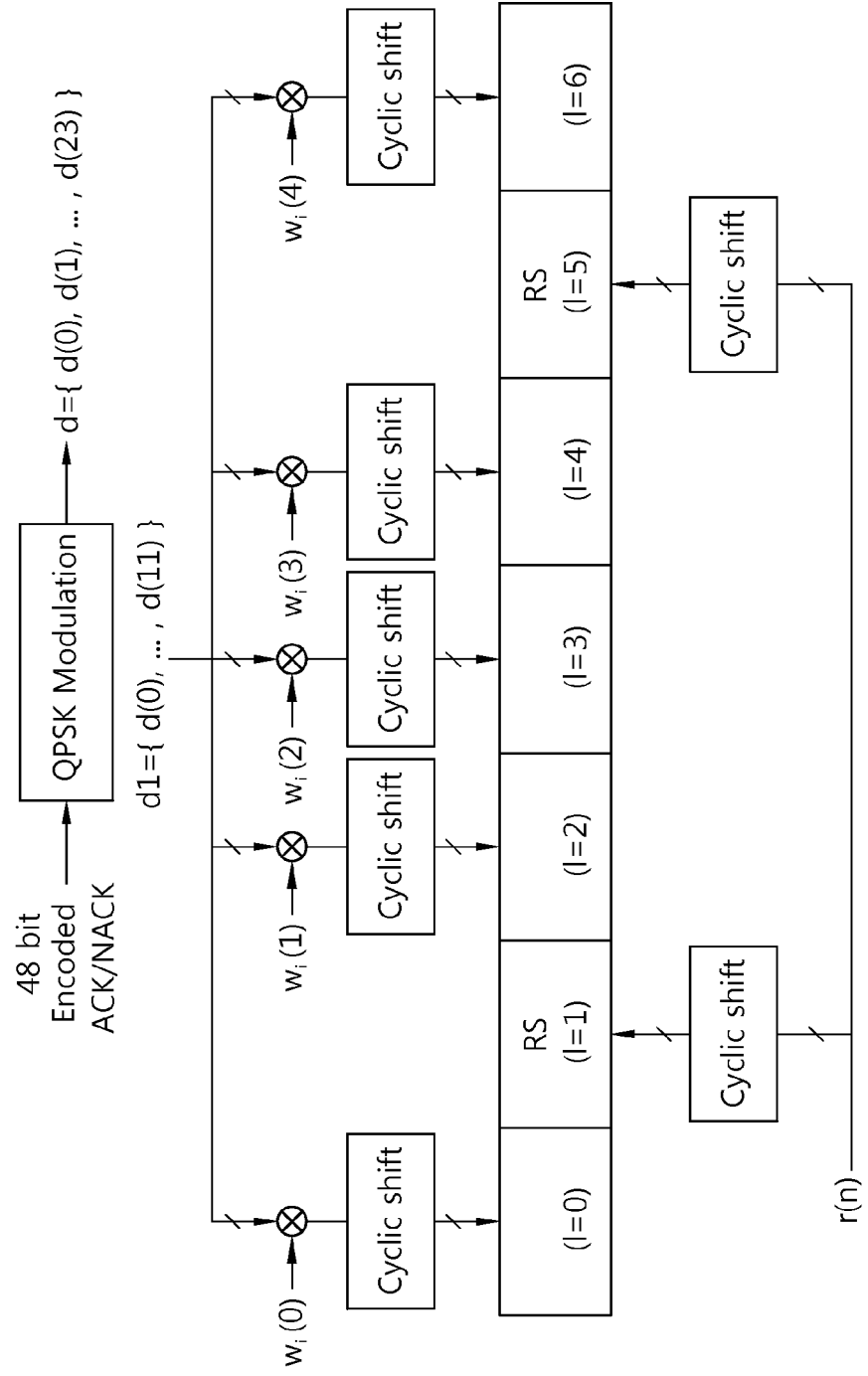
FIG. 11 is a view illustrating an exemplary structure of PUCCH format 3 in normal CP.

FIG. 11 is a view illustrating an exemplary structure of normal CP PUCCH format 3.

One slot includes seven OFDM symbols, and l has OFDM symbol numbers 0 to 6 in the slot. Two symbols with l=1, 5 are RS OFDM symbols for reference signals, and the other OFDM symbols are data OFDM symbols for ACK/NACK signals.

A 48-bit encoded ACK/NACK signal is subjected to QPSK (quadrature phase-shift keying) modulation to generate a symbol sequence d={d(0), d(1), . . . , d(23)}. d(n)(n=0, 1, . . . , 23) is a complex-valued modulated symbol. Symbol sequence d may be a set of modulated symbols. The number of bits in the ACK/NACK signal or the modulation scheme is a mere example, but is not limiting.

One PUCCH uses one RB, and one sub-frame includes a first slot and a second slot. Symbol sequence d={d(0), d(1), . . . , d(23)} is divided into two sequences each with a length of 12, i.e., d1={d(0), . . . , d(11)} and d2={d(12), . . . , d(23)}, and the first sequence d1 is transmitted in the first slot while the second sequence d2 is transmitted in the second slot. FIG. 5 shows an example in which the first sequence d1 is transmitted in the first slot.

The symbol sequence is spread with an orthogonal sequence $w_i$. The spread sequence corresponds to each OFDM symbol, and the orthogonal sequence is used to spread the symbol sequence over the data OFDM symbols to distinguish between PUCCHs (or UEs).

The orthogonal sequence comes with spread coefficient K=5 and includes five elements. The orthogonal sequence may be one of the five orthogonal sequences shown in the following Table 5 according to index i.

TABLE 7

| index i | $[w_i(0), w_i(1), w_i(2), w_i(3), w_i(4)]$ |
|---|---|
| 0 | $[1\ 1\ 1\ 1\ 1]$ |
| 1 | $[1\ e^{j2\pi/5}\ e^{j4\pi/5}\ e^{j6\pi/5}\ e^{j8\pi/5}]$ |
| 2 | $[1\ e^{j4\pi/5}\ e^{j8\pi/5}\ e^{j2\pi/5}\ e^{j6\pi/5}]$ |
| 3 | $[1\ e^{j6\pi/5}\ e^{j2\pi/5}\ e^{j8\pi/5}\ e^{j4\pi/5}]$ |
| 4 | $[1\ e^{j8\pi/5}\ e^{j6\pi/5}\ e^{j4\pi/5}\ e^{j2\pi/5}]$ |

The two slots in the sub-frame may use different orthogonal sequence indexes.

Each spread symbol sequence is cyclic shifted by a cell-specific cyclic shift value $n_{cs}^{cell}(n_s,l)$. Each cyclic shifted symbol sequence is mapped to its corresponding data OFDM symbol and is transmitted.

$n_{cs}^{cell}(n_s,l)$ is a cell-specific parameter determined by a pseudo-random sequence initialized based on a PCI (Physical Cell Identity). $n_{cs}^{cell}(n_s,l)$ varies depending on slot numbers $n_s$ in the radio frame and OFDM symbol numbers l in the slot.

Two RS OFDM symbols are transmitted, mapped with a reference signal sequence used for demodulation of an ACK/NACK signal.

As described supra, the ACK/NACK signal is spread with an orthogonal sequence with spread coefficient K=5, and thus, up to five UEs may be distinguished from each other with different orthogonal sequence indexes. This means that up to five PUCCH format 3's may be multiplexed in the same RB.

A resource index for PUCCH format 1a/1b is obtained from the latest received PDCCH resource. A resource index for PUCCH format 3 is indicated by an ARI (ACK/NACK resource indicator).

First, the base station informs the UE of a plurality of candidate resource indexes using a higher layer message such as an RRC message. The base station informs the UE of a resource index selected among the plurality of candidate resource indexes through a DL grant on the PDCCH. The field indicating the selected resource index in the DL grant is called an ARI.

For example, the base station informs the UE of four candidate resource indexes through an RRC message. The ARI on the PDCCH scheduling the PDSCH indicates one of the four candidate resource indexes, and a PUCCH format 3 is configured from the selected resource index.

To prevent the number of DL grant bits from increasing, the ARI may be transmitted using an existing DCI TPC (transmit power command).

An SPS (Semi-Persistent scheduling) is now described.

Typically, a UE first receives a DL grant from a PDCCH, then a transport block transmitted from a base station through a PDSCH indicated by the DL grant. This means every transport block comes with PDCCH monitoring, which is denoted dynamic scheduling. SPS previously defines a PDSCH resource, and the UE receives a transport block through the pre-defined resource without PDCCH monitoring.

Figure 12:
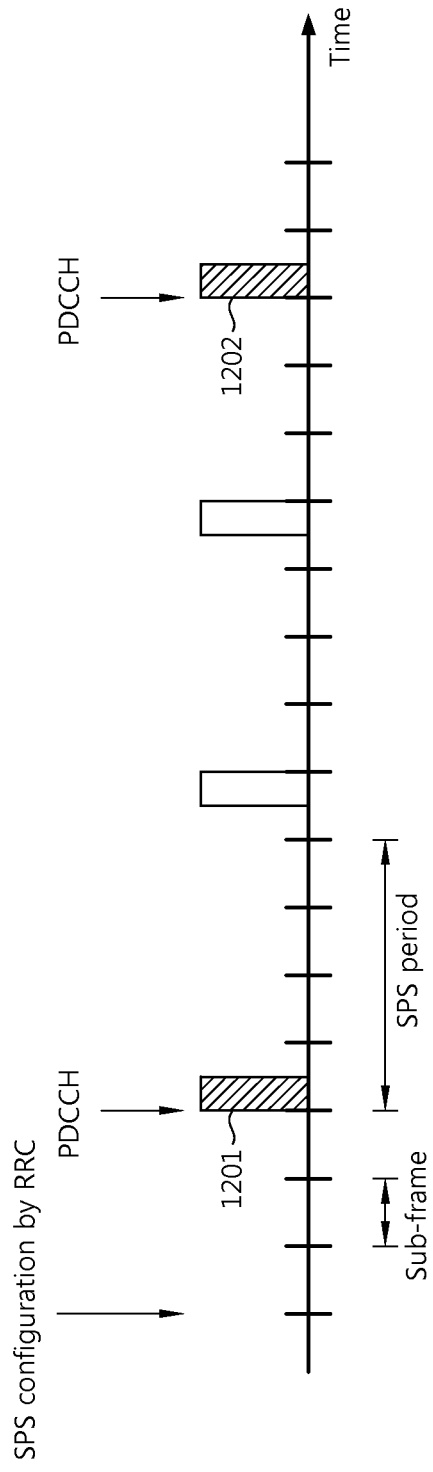
FIG. 12 illustrates an exemplary 3GPP LTE SPS.

FIG. 12 illustrates an exemplary SPS in 3GPP LTE.

FIG. 12 illustrates DL SPS, but the same may also be applicable to UL SPS.

First, the base station sends an SPS configuration to the UE through an RRC (Radio Resource Control) message. The SPS configuration includes an SPS-C-RNTI and an SPS period. Here, the SPS period is assumed to be four subframes.

Although SPS is configured, SPS is not immediately carried out. The UE may monitor a PDCCH 1201 with a CRC masked with the SPS-C-RNTI to determine whether SPS is activated, and the UE may then receive downlink data based on SPS. When NDI included in the DCI on the PDCCH 1201 is 0, a combination of several fields included in the DCI (e.g., TPC (transmit power command), CS (Cyclic Shift) of DM-RS (demodulation reference signal), MCS (Modulation and Coding scheme), RV (redundancy version), HARQ process number, or resource allocation)) may be a basis for determining whether SPS is activated or deactivated. This is further described below in detail.

If SPS is activated, the UE may receive a transport block on the PDSCH at the SPS period even without receiving the DL grant on the PDCCH. The PDSCH received with no PDCCH is denoted an SPS PDSCH.

Thereafter, the UE monitors the PDCCH 1202 with the CRC masked with the SPS-C-RNTI to identify deactivation of SPS.

According to 3GPP LTE, the PDCCH indicating activation of SPS does not require an ACK/NACK response, but the PDCCH indicating deactivation of SPS needs an ACK/NACK response. Hereinafter, a DL transport block may contain a PDCCH indicating deactivation of SPS.

As per existing PUCCH format 1a/1b, a resource index $n^{(1)}_{PUCCH}$ is acquired from the PDCCH. According to SPS scheduling, however, no PDCCH associated with the PDSCH is received, and a pre-assigned resource index is thus put in use.

For SPS, the base station informs a plurality of candidate resource indexes to the UE through an RRC message. The base station notifies the UE of a resource index in use among the plurality of candidate resource indexes through the PDCCH 1201 activating SPS (hereinafter, "SPS PDCCH").

The UE may determine that the SPS PDCCH is valid only when meeting the following conditions.

1) When the CRC parity bit for PDCCH payload is scrambled with an SPS C-RNTI,

2) When NDI is set to 0. In the case of DCI formats 2, 2A, 2B, and 2C, the NDI field may reference one for possible transport blocks.

If all the fields for each DCI have been set as shown in Tables 8 and 9 below, validation may be obtained.

TABLE 8

The special field for SPS activation

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

TABLE 9

The special field for SPS release

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

In case the result of determination shows that the SPS PDCCH is validated, the UE may consider SPS activation or release based on the received DCI information.

Unless the activation is acquired, the received DCI format may be deemed, for the UE, a DCI format that has been received with a non-matching CRC.

In case the DCI format indicates downlink SPS activation, the TPC command for PUCCH field may be used to indicate the index for one of four PUCCH resource values set by a higher layer.

Table 10 shows PUCCH resources for downlink SPS.

TABLE 10

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |

TABLE 10-continued

| Value of 'TPC command for PUCCH' | $n_{PUCCH}^{(1,p)}$ |
|---|---|
| '11' | The fourth PUCCH resource value configured by the higher layers |

Now described is a downlink channel used in LTE systems, according to an embodiment of the present invention.

Figure 13:
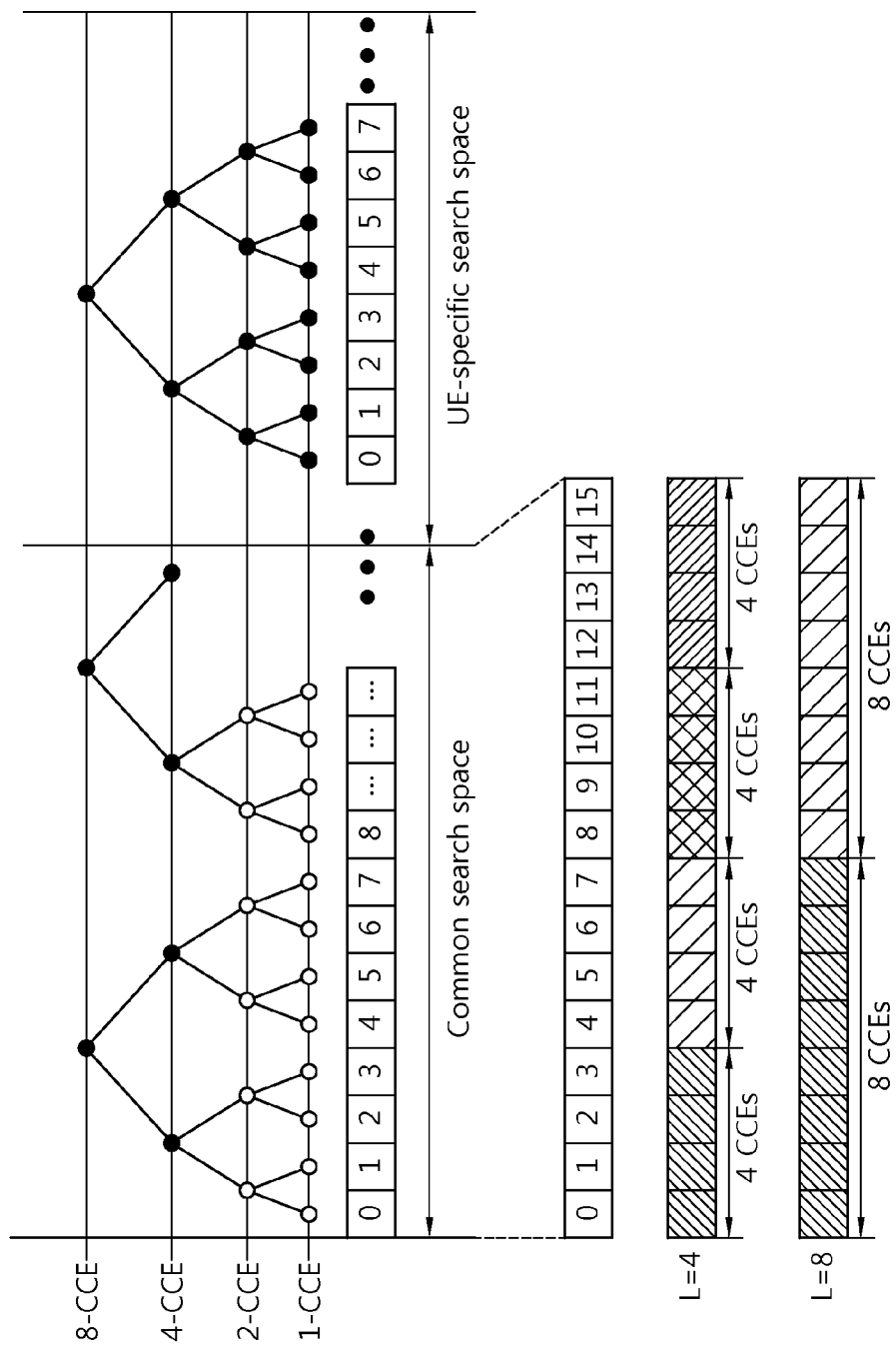
FIG. 13 is a view illustrating an example of monitoring a PDCCH.

FIG. 13 is a view illustrating an example of monitoring PDCCH.

For a PDCCH monitoring procedure, refer to 3GPP TS 36.213 V10.2.0 (2011-06), Ch. 9.

A UE can perform blind decoding for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel. The terminal is not aware of CCE aggregation level or DCI format for transmission and a position at which its PDCCH data is transmitted in a control region.

A plurality of PDCCHs may be transmitted in one sub-frame. The UE monitors a plurality of PDCCHs at every sub-frame. Here, the term "monitoring" refers to the UE attempting to perform blind decoding on a PDCCH.

In 3GPP LTE, the UE uses a search space for reducing load caused by blind decoding. The search space may be regarded as CCEs' monitoring set for searching a PDCCH. The UE monitors the PDCCH based on the search space.

The search space is divided into a common search space and a UE-specific search space. The common search space is a space for searching a PDCCH having common control information and consists of 16 CCEs, CCE index 0 to 15, and supports PDCCHs having a CCE aggregation level of {4, 8}. However, a PDCCH (DCI formats 0 and 1A) for carrying UE-specific information may be transmitted even in the common search space. The UE-specific search space supports PDCCHs having a CCE aggregation level of {1, 2, 4, 8}.

The following table shows the number of PDCCH candidates that are monitored by the UE.

TABLE 11

| | Search space $S_k^{(L)}$ | | Number | |
|---|---|---|---|---|
| Type | Aggregation level L | Size [in CCEs] | of PDCCH candidates $M^{(L)}$ | DCI Format |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of a search space is determined according to Table 11 above, and the start point of a search space is defined differently for each of the common search space and UE-specific search space. The start point of the common search space is fixed regardless of any sub-frame, but the start point of the UE-specific search space may vary per sub-frame depending on the UE identifier (e.g., C-RNTI), CCE aggregation level and/or slot number in a radio frame. In case the start point of the UE-specific search space is positioned in the common search space, the UE-specific search space and the common search space may overlap.

An aggregation of PDCCH candidates monitored by the UE may be defined on the basis of a search space. In an aggregation level 1, 2, 4 or 8, search space $S_k^{(L)}$ is defined as a set of PDCCH candidates. The CCE corresponding to PDCCH candidate m in search space $S_k^{(L)}$ is given as follows:

$$L\{(Y_k+m') \bmod \lfloor N_{CCE,k}/L \rfloor\}+i \qquad \text{Equation 1}$$

Here, i=0, ... L−1, and in case the search space is the common search space, m'=m. In case the search space is a specific search space, and a carrier indicator field (CIF) is configured to the UE, m'=m+$M^{(L)}$·$n_{CI}$, $n_{CI}$ is a value of the configured CIF. If the CIF is not configured to the UE, m'=m. Here, it is m=0, ..., $M^{(L)}$−1 and $M^{(L)}$ is the number of the PDCCH candidates for monitoring the given search space.

In the common search space, $Y_k$ is set as 0 for two aggregation levels, L=4 and L=8. In the UE-specific search space of aggregation level L, variable $Y_k$ is defined as follows:

$$Y_k=(A \cdot Y_{k-1}) \bmod D \qquad \text{Equation 2}$$

Here, $Y_{-1}=n_{RNTI}\neq 0$, A=39827, D=65537, k=$\lfloor n_s/2 \rfloor$, and $n_s$ is a slot number in a radio frame.

When a wireless device monitors the PDCCH based on the C-RNTI, a DCI format, and a search space are determined according to a PDSCH transmission mode. Table 12 below shows an example of monitoring PDCCH in which the C-RNTI is configured.

TABLE 12

| Transmission mode | DCI format | Search Space | Transmission mode of PDSCH corresponding to PDCCH |
|---|---|---|---|
| Mode 1 | DCI format 1A | Common and UE specific | Single-antenna port, port 0 |
| | DCI format 1 | UE specific | Single-antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |

TABLE 12-continued

| Transmission mode | DCI format | Search Space | Transmission mode of PDSCH corresponding to PDCCH |
|---|---|---|---|
| | DCI format 2A | UE specific | Cyclic Delay Diversity(CDD) or Transmit diversity |
| Mode 4 | DCI format 1A | Common and UE specific | Transmit diversity |
| | DCI format 2 | UE specific | Closed-loop spatial multiplexing |
| Mode 5 | DCI format 1A | Common and UE specific | Transmit diversity |
| | DCI format 1D | UE specific | Multi-user Multiple Input Multiple Output(MU-MIMO) |
| Mode 6 | DCI format 1A | Common and UE specific | Transmit diversity |
| | DCI format 1B | UE specific | Closed-loop spatial multiplexing |
| Mode 7 | DCI format 1A | Common and UE specific | If the number of PBCH transmit ports is one, single-antenna port, port 0 is used, otherwise Transmit diversity |
| | DCI format 1 | UE specific | Single-antenna port, port 5 |
| Mode 8 | DCI format 1A | Common and UE specific | If the number of PBCH transmit ports is one, single-antenna port, port 0 is used, otherwise Transmit diversity |
| | DCI format 2B | UE specific | Dual layer transmit, port 7 or 8 or single-antenna port, port 7 or 8 |

Uses of DCI formats can be classified as shown in the following table.

TABLE 13

| DCI format | Description |
|---|---|
| DCI format 0 | used for the scheduling of PUSCH |
| DCI format 1 | used for the scheduling of PDSCH codeword |
| DCI format 1A | used for the compact scheduling of one PDSCH codeword and random access procedure |
| DCI format 1B | used for the compact scheduling of one PDSCH codeword with precoding information |
| DCI format 1C | used for the compact scheduling of one PDSCH codeword |
| DCI format 1D | used for the compact scheduling of one PDSCH codeword with precoding and power offset information |
| DCI format 2 | used for the scheduling PDSCH to UEs configured in closed-loop spatial multiplexing mode |
| DCI format 2A | used for the scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustment |

DCI formats and search spaces to be used may be differently determined depending on RNTI masked to CRC which has been used for generating DCI. Table 14 below represents DCI formats and search spaces of a control channel in case that SI-RNTI, P-RNTI or RA-RNTI is masked to the CRC of the DCI.

TABLE 14

| DCI format | Search space | Transmission mode of PDSCH corresponding to PDCCH |
|---|---|---|
| DCI format 1C | Common | If the number of PBCH transmit ports is one, single-antenna port, port 0 is used, otherwise Transmit diversity |
| DCI format 1A | Common | If the number of PBCH transmit ports is one, single-antenna port, port 0 is used, otherwise Transmit diversity |

Table 15 below shows DCI formats and search spaces of a control channel in case that SPS-C-RNT is masked to the CRC of the DCI

TABLE 15

| Transmission mode | DCI format | Search space | Transmission mode of PDSCH corresponding to PDCCH |
|---|---|---|---|
| Mode 1 | DCI format 1A | Common and UE specific | Single antenna port, port 0 |
| | DCI format 1 | UE specific | Single antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Transmit diversity |
| Mode 4 | DCI format 1A | Common and UE specific | Transmit diversity |
| | DCI format 2 | UE specific | Transmit diversity |
| Mode 5 | DCI format 1A | Common and UE specific | Transmit diversity |
| Mode 6 | DCI format 1A | Common and UE specific | Transmit diversity |

TABLE 15-continued

| Transmission mode | DCI format | Search space | Transmission mode of PDSCH corresponding to PDCCH |
|---|---|---|---|
| Mode 7 | DCI format 1A | Common and UE specific | Single antenna port 5 |
|  | DCI format 1 | UE specific | Single antenna port 5 |
| Mode 8 | DCI format 1A | Common and UE specific | Single antenna port 7 |
|  | DCI format 2B | UE specific | Single antenna port 7 or 8 |
| Mode 9 | DCI format 1A | Common and UE specific | Single antenna port 7 |
|  | DCI format 2C | UE specific | Single antenna port 7 or 8 |
| Mode 10 | DCI format 1A | Common and UE specific | Single antenna port 7 |
|  | DCI format 2D | UE specific | Single antenna port 7 or 8 |

Table 16 below shows search spaces and DCI formats used in case that temporary C-RNTI is masked to the CRC of the DCI.

TABLE 16

| DCI format | Search space | Transmission mode of PDSCH corresponding to PDCCH |
|---|---|---|
| DCI format 1A | Common and UE specific | If the number of PBCH transmit ports is one, single-antenna port, port 0 is used, otherwise Transmit diversity |
| DCI format 1 | Common and UE specific | If the number of PBCH transmit ports is one, single-antenna port, port 0 is used, otherwise Transmit diversity |

Figure 14:
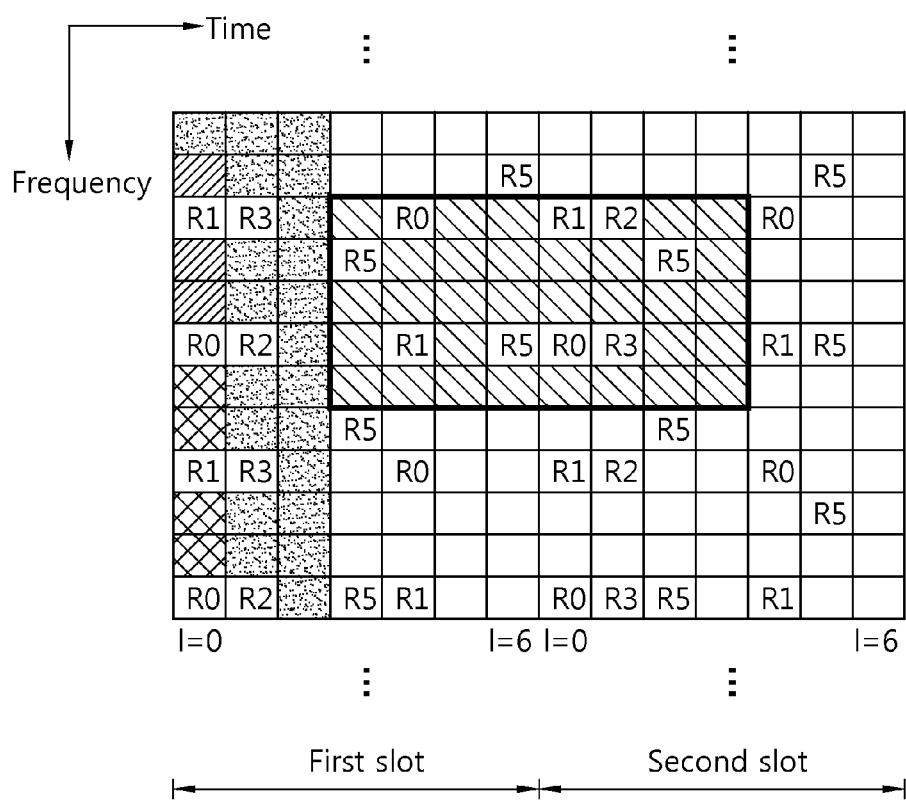
FIG. 14 illustrates a 3GPP LTE downlink sub-frame assigned with a reference signal and a control channel.

FIG. 14 shows an example of a downlink subframe in which a reference signal and a control channel in 3GPP LTE are allocated.

A downlink subframe may be classified into a control region and a data region. For example, in the downlink subframe, the control region (or a PDCCH region) includes front three OFDM symbols and the data region in which a PDSCH is transmitted includes remaining OFDM symbols.

In the control region, a PCFICH, a PHICH and/or the PDCCH are transmitted.

The physical HARQ ACK/NACK indicator channel (PHICH) may transmit a hybrid automatic retransmission request (HARQ) information as a response to a uplink transmission.

The physical control format indicator channel (PCFICH) may transmit the information of the number of OFDM symbols allocated to the PDCCH. For example, a control format indicator (CFI) of the PCFICH may indicate three OFDM symbols. The region excluding the resource through which the PCFICH and/or the PHICH is transmitted is the PDCCH region that a wireless device monitors the PDCCH.

In the subframe, various reference signals may be transmitted as well.

A cell-specific reference signal reference signal (CRS) is a reference signal that all wireless devices in a cell may receive, and may be transmitted over the whole downlink frequency band. In FIG. 6, 'R0' denotes an RE (resource element) where a CRS for a first antenna port is transmitted, 'R1' which is an RE where a CRS for a second antenna port is transmitted, 'R2' which is an RE where a CRS for a third antenna port is transmitted, and 'R3' which is an RE where a CRS for a fourth antenna port is transmitted.

The RS sequence $r_{l,n_s}(m)$ for CRS is defined as follows.

$$r_{l,n_s}(m) = \frac{1}{\sqrt{2}}(1 - 2 \cdot c(2m)) + j\frac{1}{\sqrt{2}}(1 - 2 \cdot c(2m + 1)) \quad \text{<Equation 3>}$$

Herein, m=0, 1, . . . , $2N_{RB}^{max,DL}-1$, $N_{RB}^{max,DL}$ is the maximum number of RBs, ns is a slot number in a radio frame, and l is an OFDM symbol index in a slot.

A pseudo-random sequence, c(i), is defined by a gold sequence whose length is 31, as follows.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{<Equation 4>}$$

Herein, Nc=1600, and the first m-sequence is initialized as x1(0)=1, x1(n)=0, m=1, 2, . . . , 30. The second m-sequence is initialized as $c_{init}=2^{10} \cdot (7 \cdot (n_s+1)+l+1) \cdot (2 \cdot N_{ID}^{cell}+1)+2 \cdot N_{ID}^{cell}+N_{CP}$ at the beginning of each OFDM symbol. $N_{ID}^{cell}$ is a physical cell identity (PCI) of the cell, and $N_{CP}=1$ in case of the normal CP, and $N_{CP}=0$ in case of the extended CP.

Also, a UE-specific reference signal (URS) may be transmitted in a subframe. Although the CRS is transmitted in the entire region of a subframe, the URS is transmitted in the data region of the sub-frame, and is a reference signal used for demodulating the PDSCH. In FIG. 7, 'R5' denotes an RE where the URS is transmitted. A DM-RS is a reference signal used for demodulating the EPDCCH data.

The URS may be transmitted in an RB in which the corresponding PDSCH data is mapped. Although in FIG. 7, R5 is denoted outside the area in which the PDSCH is transmitted, this is merely to indicate the position of the RE to which the URS is mapped.

The URS is may be a reference signal which is demodulated only by a specific wireless device. The RS sequence $r_{l,n_s}(m)$ for the URS is the same as Equation 3. At this time, m=0, 1, . . . , $12N_{RB}^{PDSCH}-1$ and $N_{RB}^{PDSCH}$ is the number of RBs which is used for the corresponding PDSCH transmission. In case that the URS is transmitted through a single antenna, the pseudo-random sequence generator is initialized as $c_{init}=(\lfloor n_s/2 \rfloor+1) \cdot (2N_{ID}^{cell}+1) \cdot 2^{16}+n_{RNTI}$ at the start of each subframe. $n_{RNTI}$ is an identifier of a wireless device.

The above-described initializing method is associated with the case where the URS is transmitted through a single antenna. When the URS is transmitted through a multi-antenna, the pseudo-random sequence generator is initialized as $c_{init}=(\lfloor n_s/2 \rfloor+1) \cdot (2n_{ID}^{(nSCID)}+1) \cdot 2^{16}+n_{SCID}$ at the start of each sub-frame. $n_{SCID}$ is a parameter that is acquired from a DL grant (for example, DCI format 2B or 2C) related with PDSCH transmission.

The URS supports multiple input multiple output (MIMO) transmission. Depending on an antenna port or layer, the RS sequence for the URS may be spread to the spread sequence as follows.

TABLE 17

| Layer | [w(0), w(1), w(2), w(3)] |
| --- | --- |
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path inputted to a pre coder. A rank is the number of non-zero eigenvalue in the MIMO channel matrix, and is the same as the number of layer or space stream. The layer may correspond to an antenna port that distinguishes the URS and/or a spread sequence which is applied to the URS.

Meanwhile, the PDCCH is monitored in a restricted region such as a control region in a subframe, and the CRS transmitted from whole bands is used for demodulating the PDCCH. As the sort of control data becomes diverse and an amount of the control data is increased, a flexibility of scheduling becomes deteriorated with the existing PDCCH only. Also, in order to decrease overhead owing to the CRS transmission, an enhanced PDCCH (EPDCCH) is introduced.

Figure 15:
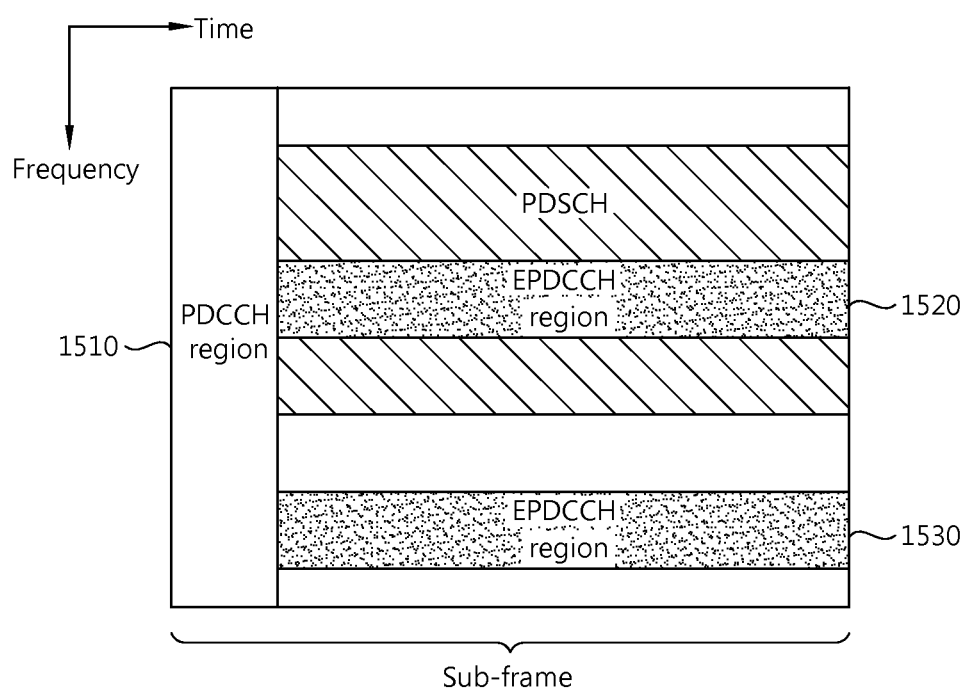
FIG. 15 illustrates an exemplary sub-frame with an EPDCCH.

FIG. 15 illustrates an exemplary sub-frame having an EPDCCH.

A sub-frame may include zero or one PDCCH region 1510 and zero or more ePDCCH regions 1520 and 1530.

The EPDCCH regions 1520 and 1530 are regions where the UE monitors epochs. The PDCCH region 1510 is positioned at first three or up to first four OFDM symbols in a sub-frame, and the EPDCCH regions 1520 and 1530 may be flexibly scheduled at OFDM symbols behind the PDCCH region 1510.

One or more EPDCCH regions 1520 and 1530 may be designated in the UE, and the UE may monitor EPDCCH data in the designated EPDCCH regions 1520 and 1530.

The number/position/size of the EPDCCH regions 1520 and 1530, and/or information regarding a sub-frame to monitor the EPDCCHs may be informed by the base station to the UE through, e.g., an RRC (radio resource control) message.

In the PDCCH region 1510, the PDCCH may be demodulated based on a CRS. In the EPDCCH regions 1520 and 1530, a DM-RS, not a CRS, may be defined for demodulation of the EPDCCHs. The DM-RS may be transmitted in its corresponding EPDCCH region 1520 and 1530.

An RS sequence for the DM-RS is the same as shown in Equation 3. In this case, $m=0, 1, \ldots, 12N_{RB}^{max,DL}-1$, and $N_{RB}^{max,DL}$ is the maximum number of RBs. The pseudo-random sequence generator may be initialized as $c_{init}=(\lfloor n_s/2 \rfloor+1) \cdot (2n_{ID,i}^{EPDCCH}+1) \cdot 2^{16}+n_{SCID}^{EPDCCH}$ at the start of each sub-frame. ns is a slot number in the radio frame, $n_{ID,i}^{EPDCCH}$ is a cell index related to a corresponding EPDCCH region, and $n_{SCID}^{EPDCCH}$ is a parameter given from a higher layer signaling.

Each EPDCCH region 1520 and 1530 may be used in scheduling for a different cell. For example, the EPDCCH in the EPDCCH region 1520 may carry scheduling information for a primary cell, and the EPDCCH in the EPDCCH region 1530 may carry scheduling information for a secondary cell.

When the EPDCCHs in the EPDCCH regions 1520 and 1530 are transmitted through multiple antennas, the DM-RSs in the EPDCCH regions 1520 and 1530 may be subjected to the same precoding as the EPDCCHs.

As compared with PDCCHs that adopt CCEs as their units for transmission, EPDCCHs use ECCEs (Enhanced Control Channel Elements) as their units for transmission. Aggregation levels may be defined in units of resources to monitor EPDCCHs. For example, assuming that one ECCE is a minimum resource for an EPDCCH, aggregation levels L={1, 2, 4, 8, 16} may be defined. Also in the EPDCCH regions, search spaces may be defined. The UE may monitor EPDCCH candidates based on aggregation levels.

Figure 16:
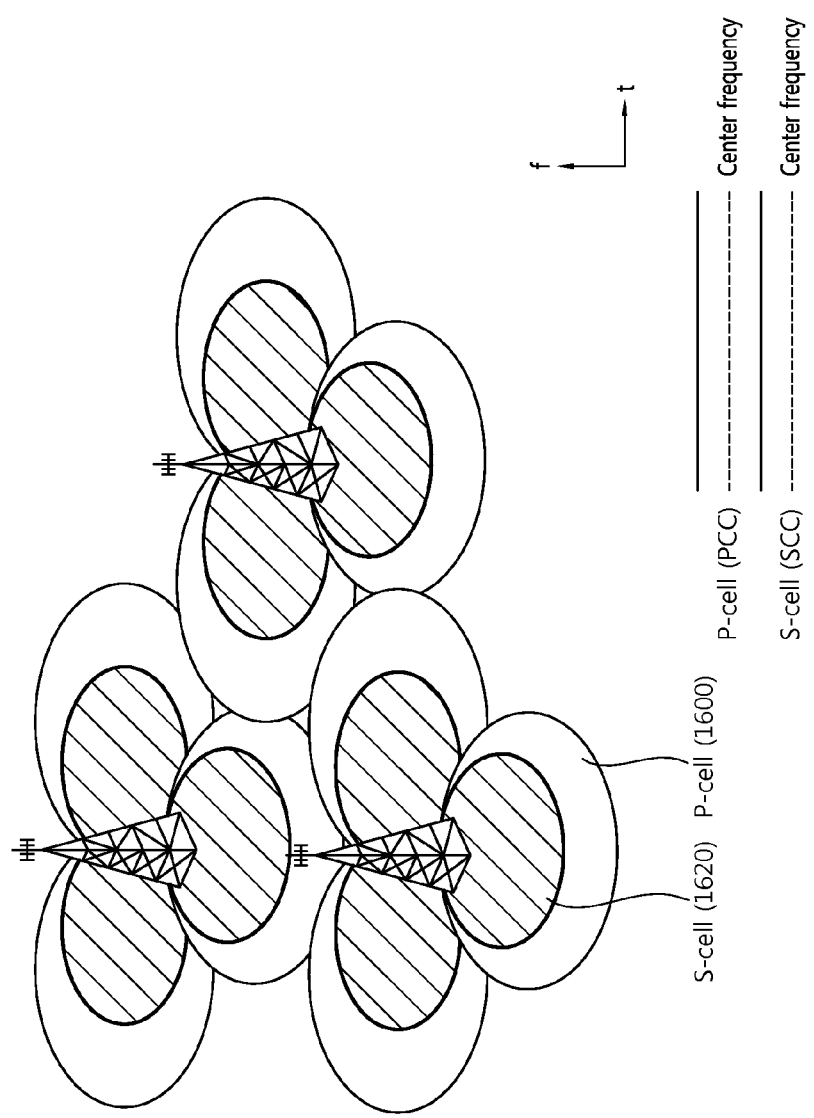
FIG. 16 is a concept view illustrating a P-cell and an S-cell.

FIG. 16 is a concept view illustrating a P-cell and an S-cell.

In FIG. 16, one of deployment scenarios of the P-cell and the S-cell is disclosed exemplarily. The P-cell and the S-cell may be configured in various ways. Each of the P-cell and the S-cell can include a different center frequency, Referring to FIG. 16, a base station can perform carrier aggregation based on PCC of the P-cell 1600 and one or more SCC of the S-cell 1620. When 2 cells or more exist, the base station can determine one cell as the P-cell 1600 and determine another cell as S-cell 1620. The base station may transmit data to a UE by using aggregated frequency bandwidth, after aggregating CC of the determined P-cell 1600 and S-cell 1620. The UE also can transmit data to the base station by using aggregated frequency bandwidth. The P-cell 1600 and S-cell 1620 of FIG. 15 is an example of a scenario where the P-cell 1600 and S-cell 1620 are arranged, where a transmission range of data on the basis of PCC is greater than that of data on the basis of SCC.

The UE can perform radio resource control (RRC) connection through the PCC. Furthermore, the UE can attempt random access to the base station through a physical random access channel (PRACH) based on a signal which is signaled through the PCC. That is, the UE can perform initial connection establishment or connection re-establishment process to the base station through the PCC in carrier aggregation environment.

The SCC of the S-cell 1620 may be used for providing additional radio resources. In order to perform carrier aggregation by which SCC is aggregated to PCC, the UE needs to perform neighbor cell measurement for acquiring information on the neighbor cells. The base station can determine whether to aggregate the SCC to the PCC according to the result of the neighbor cell measurement. For example, in the P-cell, a NCT subframe to be described may be transmitted via the SCC. The base station can transmit PDCCH data through the PCC to the UE. The PDCCH data may include information on allocation of PDSCH data to be transmitted via a downlink PCC bandwidth and SCC bandwidth, and information on approval of data transmission via an uplink.

The P-cell 1600 and the S-cell 1620 may perform carrier aggregation through configuration and activation and transmit and receive data through an aggregated frequency bandwidth.

For ease of description, embodiments of the present invention hereinafter assume a system that performs downlink transmission based on a band in which a plurality of component carriers (or cells) have been aggregated and that performs uplink transmission based on a single component carrier. For example, assume that the number of downlink CCs are two and the number of uplink CCs are one. Hereinafter, according to an embodiment of the present invention, "CC" means a cell. Upon downlink transmission, base stations corresponding to CCs may be located in the same or different sites. Two downlink CCs may have the same physical cell identifier. A user equipment (UE) may obtain scheduling information of downlink data transmitted through a plurality of CCs by receiving downlink control signals (e.g., PDCCHs). The UE may receive PDSCHs transmitted through a plurality of CCs based on the scheduling information of the received downlink data. The UE may obtain uplink scheduling information by receiving a downlink control signal transmitted through at least one CC. The UE may transmit a PUSCH through an uplink resource scheduled through a CC. The cell transmitting the scheduling information of the PUSCH may be preset in the UE's initial access process, for example. For example, the UE may be configured to receive the scheduling information of the PUSCH from a primary cell. The UE may generate a reference signal for demodulating the PUSCH based on the physical cell identifier of the cell transmitting the scheduling information of the PUSCH.

Figure 17:
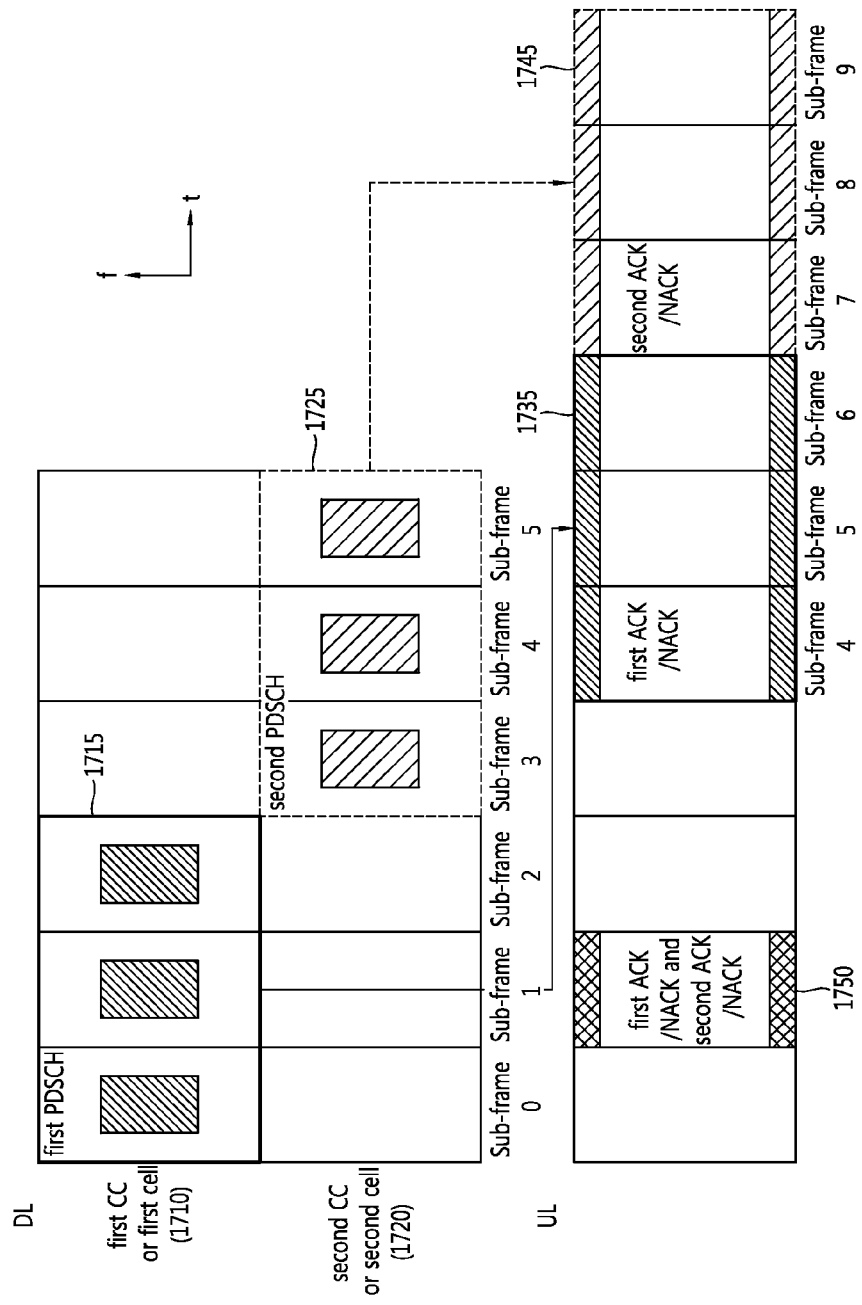
FIG. 17 is a concept view illustrating a method for transmitting an ACK/NACK by a UE according to an embodiment of the present invention.

FIG. 17 is a concept view illustrating a method for transmitting an ACK/NACK by a UE according to an embodiment of the present invention.

FIG. 17 illustrates a method in which the UE receives a PDSCH from one of a plurality of CCs in one sub-frame and transmits an ACK/NACK on uplink in response to the received PDSCH.

The UE may transmit an ACK/NACK in response to the PDSCH transmitted from one CC. The UE may transmit the ACK/NACK based on the physical cell identifier of the CC that has transmitted the PDSCH to the UE.

The UE may determine a cyclic shift and sequence (e.g., a base sequence, a cyclic shift, or an orthogonal cover sequence) for transmitting the ACK/NACK, and based on the determined result, the UE may transmit the ACK/NACK to the base station. The UE may determine a cyclic shift and sequence for transmitting the ACK/NACK based on the physical cell identifier of the CC transmitting the PDSCH. In case the UE receives a PDSCH from a single CC only, even when the UE transmits an ACK/NACK generated based on the physical cell identifier, the CC having transmitted the PDSCH, as corresponding to the ACK/NACK, may be specified.

In order to prevent a plurality of CCs from transmitting PDSCHs to the UE in a single sub-frame, the sub-frame may be configured so that only one of the plurality of CCs may schedule a PDSCH. The sub-frame where a plurality of CCs transmit PDSCHs may be pre-configured at a higher layer.

Referring to FIG. 17, assuming that a first cell 1710 and a second cell 1720 have been carrier-aggregated, only one of the first cell 1710 and the second cell 1720 may transmit PDSCHs 1715 and 1725 to the UE in one sub-frame. The first cell 1710 and the second cell 172 perform TDM (time division multiplexing) so that the first cell 1710 transmits first PDSCHs 1715 in sub-frames 0 to 2, and the second cell 1720 transmits second PDSCHs 1725 in sub-frames 3 to 5. The sub-frame 1750 where the UE may receive the PDSCH from each of the first cell 1710 and the second cell 1720 may be separately configured at a higher layer. In case a sub-frame received by the UE is not the sub-frames separately configured to transmit PDSCHs from the two cells at the higher layer, the UE may generate ACKs/NACKs 1735 and 1745 for the PDSCHs 1715 and 1725 transmitted from one cell based on the physical cell identifier of the cell having transmitted the PDSCHs and the UE may transmit the ACKs/NACKs through an uplink channel. The first ACKs/NACKs 1735 for the first PDSCHs 1715 may be td in sub-frames 4 to 6, and the second ACKs/NACKs 1745 for the second PDSCHs 1725 may be transmitted in sub-frames 7 to 9.

Figure 18:
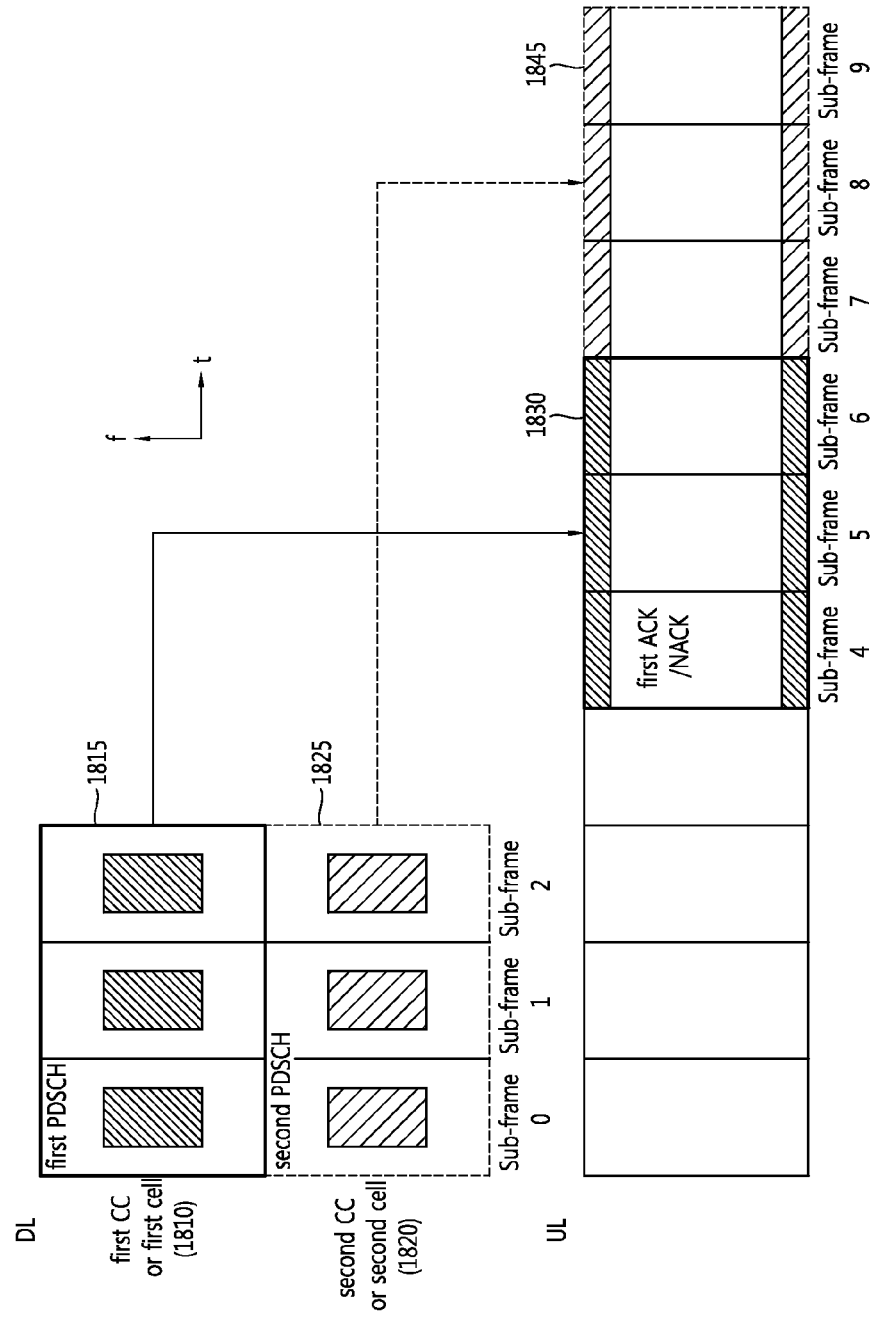
FIG. 18 is a concept view illustrating a method for transmitting an ACK/NACK by a UE according to an embodiment of the present invention.

FIG. 18 is a concept view illustrating a method for transmitting an ACK/NACK by a UE according to an embodiment of the present invention.

FIG. 18 illustrates a method in which the UE receives PDSCHs from a plurality of CCs and transmit ACKs/NACKs through uplink channels in response to the received PDSCHs.

In case a plurality of CCs simultaneously transmit PDSCHs in one sub-frame, the UE may transmit ACKs/NACKs for the PDSCHs received through the plurality of CCs as follows.

The UE may assign priorities to the transmitted PDSCHs so that the UE transmits an ACK/NACK for a PDSCH of higher priority earlier than the others. For example, In case the PDSCH received through the first CC is higher in priority than the PDSCH received through the second CC, the UE may transmit an ACK/NACK for the PDSCH received through the first CC earlier than the others. Hereinafter, according to an embodiment of the present invention, information on the order of priority used to transmit ACKs/NACKs in response to PDSCHs received from a plurality of CCs may be term "ACK/NACK transmission priority information."

The ACK/NACK transmission priority information may be transmitted from a higher layer to the UE or may be transmitted from the base station to the UE through dynamic signaling. The UE may transmit an ACK/NACK in response to the PDSCH received through the CC having the highest ACK/NACK transmission priority earlier than the others. The UE may transmit an ACK/NACK in response to the PDSCH received through the CC having the second highest ACK/NACK transmission priority after transmitting the PDSCH of the highest ACK/NACK transmission priority.

In FIG. 18, it is assume for example that the first cell 1810 and the second cell 1820 have been carrier-aggregated and that the first cell 1810 is set to be higher in ACK/NACK transmission priority than the second cell 1820. The UE may first transmit, through the first sub-frame 1830, an ACK/NACK for the PDSCH transmitted from the first cell 1810 having a higher ACK/NACK transmission priority. The UE may then transmit, through the second sub-frame 1845, an ACK/NACK for the PDSCH 1825 transmitted from the second cell 1820 that comes next to the first cell 1810 in the ACK/NACK transmission priority. Referring to FIG. 18, in response to the first PDSCH 1815 transmitted through sub-frames 0 to 2 corresponding to the first ACK/NACK transmission priority, the first ACKs/NACKs 1830 may be transmitted through sub-frames 4 to 6. Next, in response to the second PDSCH 1825 transmitted through sub-frames 0 to 2 corresponding to the second ACK/NACK transmission priority, the first ACKs/NACKs 1845 may be transmitted through sub-frames 7 to 9.

In other words, the UE may transmit through different sub-frames ACKs/NACKs for PDSCHs differing in priority from each other. Each cell may determine a timing when the UE transmits an ACK/NACK for the PDSCH that the cell has transmitted, based on the priority assigned to the PDSCH. Each cell may receive an ACK/NACK transmitted from the UE through the sub-frame corresponding to the determined ACK/NACK transmission timing, based on the determined ACK/NACK transmission timing.

According to an embodiment of the present invention, a plurality of cells may have difficulty sharing scheduling information therebetween. In such case, each cell may not be aware of whether other cell transmits a PDSCH in the same sub-frame. Accordingly, each cell may not exactly grasp the transmission timing of its PDSCH. Accordingly, a cell which is lower in ACK/NACK transmission priority may receive an ACK/NACK for its PDSCH by attempting reception of the ACK/NACK in the sub-frame corresponding to the ACK/NACK transmission timing or its subsequent sub-frame. If a cell has lower transmission priority, the cell may be configured to constrain PDSCH scheduling through consecutive sub-frames so that the ACK/NACK procedure between the cell and the UE may be clearly carried out. The PDSCH scheduling constraint to lower transmission priority cells may be set by higher layer signaling.

Figure 19:
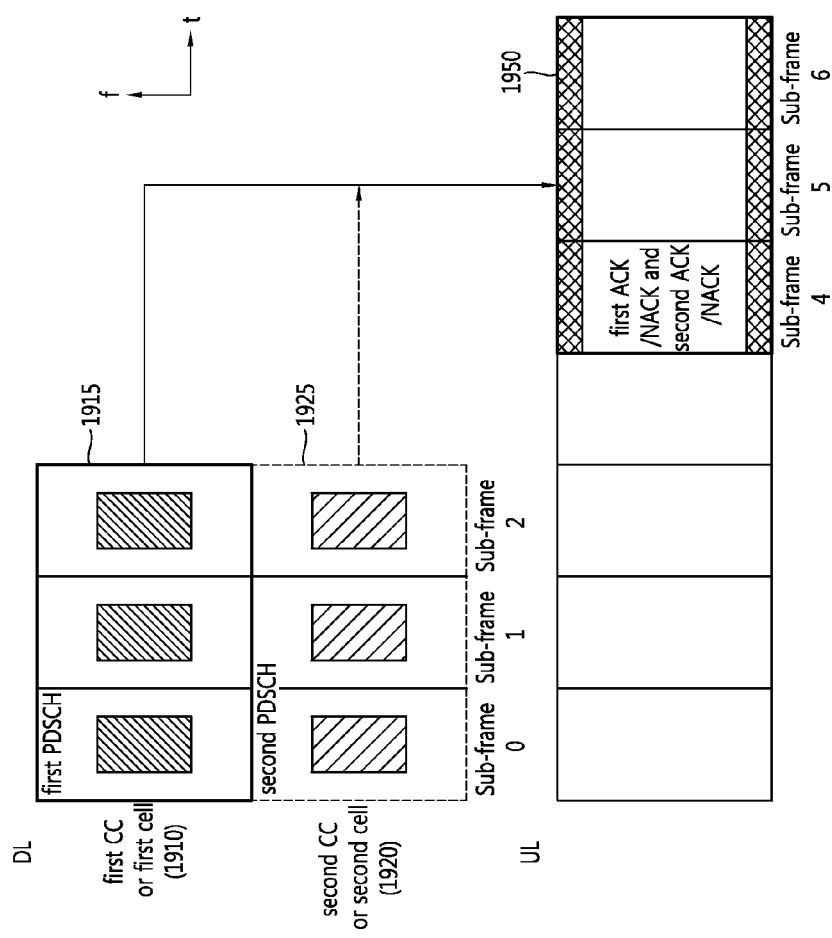
FIG. 19 is a concept view illustrating a method for transmitting an ACK/NACK by a UE according to an embodiment of the present invention.

FIG. 19 is a concept view illustrating a method for transmitting an ACK/NACK by a UE according to an embodiment of the present invention.

FIG. 19 illustrates a method in which the UE receives PDSCHs through a plurality of CCs and transmits ACK/NACKs on uplink in response to the received PDSCHs, according to an embodiment of the present invention.

In case a plurality of CCs transmit PDSCHs to the UE through one sub-frame and the UE transmits ACKs/NACKs for two or more PDSCHs through one sub-frame, the UE may conduct the following operation.

The UE may transmit in one sub-frame ACKs/NACKs for PDSCHs received through the plurality of CCs. The cell corresponding to each CC should be able to receive ACK/NACK information on each PDSCH transmitted from the CC. According to an embodiment of the present invention, resources used for the UE to transmit an ACK/NACK for the PDSCH received from each of the plurality of CCs may be determined based upon the cell identifier (e.g., a virtual cell identifier) rather than the physical cell identifier corresponding to the CC. As identifier for the cell corresponding to each CC, a replacement value (e.g. a virtual cell identifier) of the physical cell identifier, may be used. That is, the UE may utilize resources for transmission of an ACK/NACK determined based on a virtual cell identifier instead of a physical cell identifier.

Referring to FIG. 19, for example, the UE may transmit, through different resources in one sub-frame, an ACK/NACK for the first cell 1910 and an ACK/NACK for the second cell 1920. The first cell 1910 may demodulate the ACK/NACK 1950 transmitted from the UE based on the virtual cell identifier of the first cell 1910 to obtain the ACK/NACK for the first PDSCH 1915 transmitted from the first cell 1910. The second cell 1920 may demodulate the ACK/NACK 1950 transmitted from the UE based on the virtual cell identifier of the second cell 1920 to obtain the ACK/NACK for the second PDSCH 1925 transmitted from the second cell 1920.

As another example, the UE may generate an ACK/NACK for the first cell and an ACK/NACK for the second cell based on one virtual cell identifier, and the UE may transmit the generated ACKs/NACKs to the first cell and the second cell, respectively. The first cell and the second cell may receive the ACKs/NACKs generated based on the virtual cell identifier. The first cell and the second cell may obtain the ACK/NACK for each cell from the ACK/NACK payload decoded based on the virtual cell identifier. The ACK/NACK for each cell included in the ACK/NACK payload may be determined in various manners. Now described is a method for positioning the ACK/NACK of each cell in the ACK/NACK payload.

According to an embodiment of the present invention, the UE may determine the size of an ACK/NACK payload for transmitting ACKs/NACKs as follows.

Figure 20:
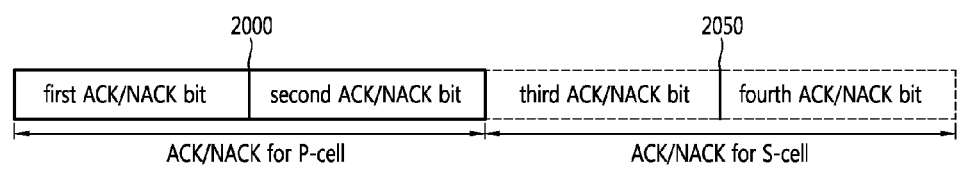
FIG. 20 is a concept view illustrating ACK/NACK bits according to an embodiment of the present invention.

FIG. 20 is a concept view illustrating ACK/NACK bits according to an embodiment of the present invention.

The UE is scheduled for PDSCHs by a plurality of CCs, and the UE may be aware of the number of ACKs/NACKs the UE is supposed to transmit. However, in case the plurality of cells corresponding to the plurality of CCs do not share the information regarding scheduling the PDSCHs for the UE, each cell cannot be aware of the total number of ACKs/NACKs transmitted by the UE. According to an embodiment of the present invention, the UE transmits ACKs/NACKs according to a size of ACK/NACK payload pre-determined based on transmission mode. Accordingly, even without sharing the PDSCH scheduling information between the cells, each cell may know the size of ACK/NACK payload.

Referring to FIG. 20, for example, in case the first cell and the second cell have been carrier-aggregated, the first cell and the second cell, in the case of FDD, may be assumed to be in use of transmission mode where each cell may transmit up to two transport blocks. In such case, the UE may always generate and transmit four bits of ACKs/NACKs regardless of the number of transport blocks indicated by the PDCCHs received from the first cell and/or the second cell. The cell receiving the four ACK/NACK bits may extract its corresponding ACK/NACK information from the four ACK/NACK bits. For example, the cell may obtain the ACK/NACK corresponding to the PDSCH it has transmitted, under the assumption that the ACK/NACK corresponding to the transport block not actually scheduled is an NACK.

The ACKs/NACKs respectively assigned to the cells may be positioned in the ACK/NACK payload. The UE may include ACK/NACK signals for the PDSCHs received from the cells at the ACK/NACK positions designated per cell in the ACK/NACK payload, and the UE may transmit the ACK/NACK signals. For example, an ACK/NACK signal may be positioned in the ACK/NACK payload with respect to a cell index such as an S-cell index. The UE may include an ACK/NACK for a PDSCH transmitted from a P-cell at a first position 2000 of the ACK/NACK payload and an ACK/NACK for a PDSCH transmitted from an S-cell at a second position 2050 of the ACK/NACK payload, and the UE may transmit the ACK/NACK. The P-cell and the S-cell may obtain the ACK/NACK information for their respective PDSCHs based on PUCCHs transmitted from the UE. Four ACK/NACK bits shown in FIG. 20 are merely an example. The number of ACK/NACK bits may vary depending on the number of transport blocks transmitted through a plurality of cells.

A CSI feedback method by a UE is now described, according to an embodiment of the present invention.

The UE may transmit, through uplink CCs, CSI feedbacks for downlink channels transmitted through a plurality of CCs. The UE may determine information for CSI feedback based on the physical cell identifier of the cell transmitting a PDSCH in order to conduct periodic CSI feedback. The information necessary for CSI feedback transmission may include a base sequence, a cyclic shift, or an orthogonal cover sequence. The UE may conduct periodic CSI feedback based on the determined information for CSI feedback. Further, the UE may perform a CSI feedback operation in response to an aperiodic CSI request from a cell. Hereinafter described is a CSI feedback operation responsive to an aperiodic CSI request.

Figure 21:
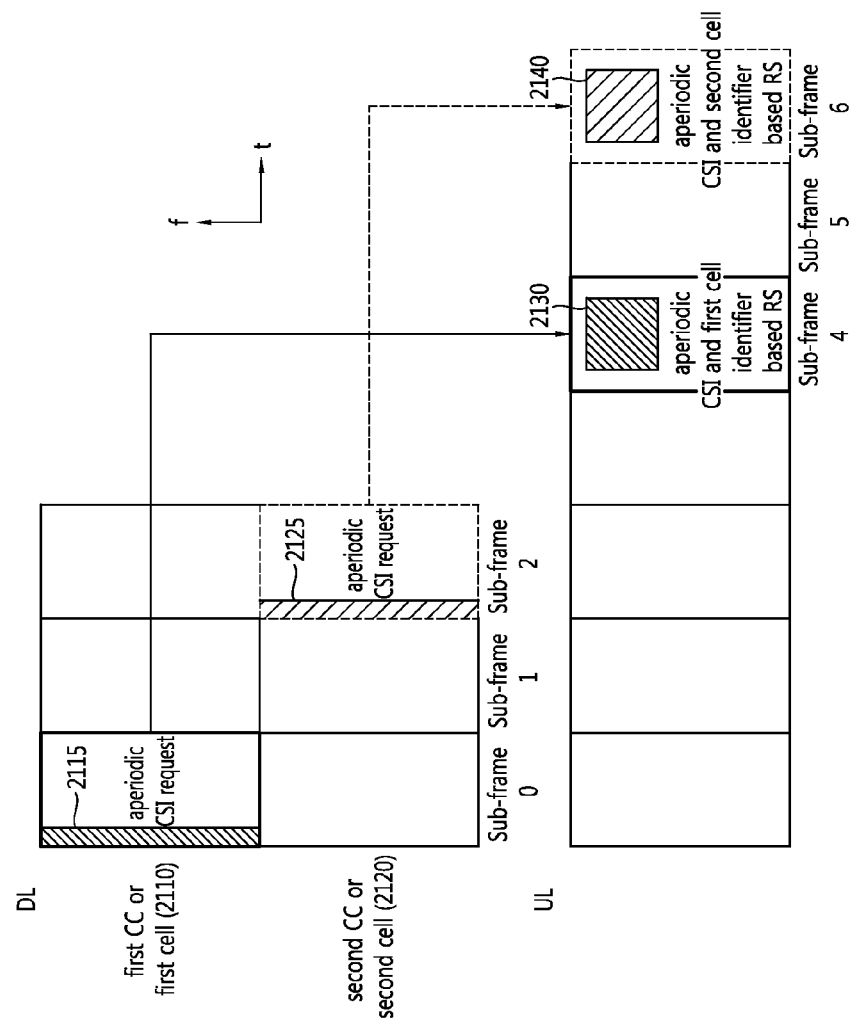
FIG. 21 is a concept view illustrating a CSI feedback method according to an embodiment of the present invention.

FIG. 21 is a concept view illustrating a CSI feedback method according to an embodiment of the present invention.

FIG. 21 illustrates an example in which a UE receives a downlink control signal including a CSI request for one of a plurality of CCs.

An aperiodic CSI feedback request for one of a plurality of carrier-aggregated cells may be sent to the UE. In such case, the UE may generate a PUSCH reference signal based on identifier information (e.g., a physical cell identifier) on the cell for which the aperiodic CSI feedback is targeted, and the UE may transmit CSI feedback information. When receiving the aperiodic CSI feedback, the base station may demodulate the received CSI feedback based on the PUSCH reference signal.

Referring to FIG. 21, for example, in case the first cell 2110 and the second cell 2120 have been carrier-aggregated, the first cell 2110 may send an aperiodic CSI feedback request 2115 for the first cell 2110 to the UE. When receiving the aperiodic CSI feedback request 2115 for the first cell 2110, the UE may generate a PUSCH reference signal 2130 based on the physical cell identifier of the first cell and the aperiodic CSI feedback, and the UE may transmit the PUSCH reference signal 2130 to the first cell 2110 through an uplink channel. The first cell 2110 may demodulate the aperiodic CSI feedback information 2130 transmitted from the UE based on the PUSCH reference signal.

The second cell 2120 may send an aperiodic CSI feedback request 2115 for the second cell 2120 to the UE. When receiving the aperiodic CSI feedback request 2115 for the first cell 2120, the UE may generate a PUSCH reference signal based on the physical cell identifier of the second cell and the aperiodic CSI feedback, and the UE may transmit the PUSCH reference signal to the second cell 2120 through an uplink channel. The second cell 2120 may demodulate the aperiodic CSI feedback information 2140 transmitted from the UE based on the PUSCH reference signal.

Figure 22:
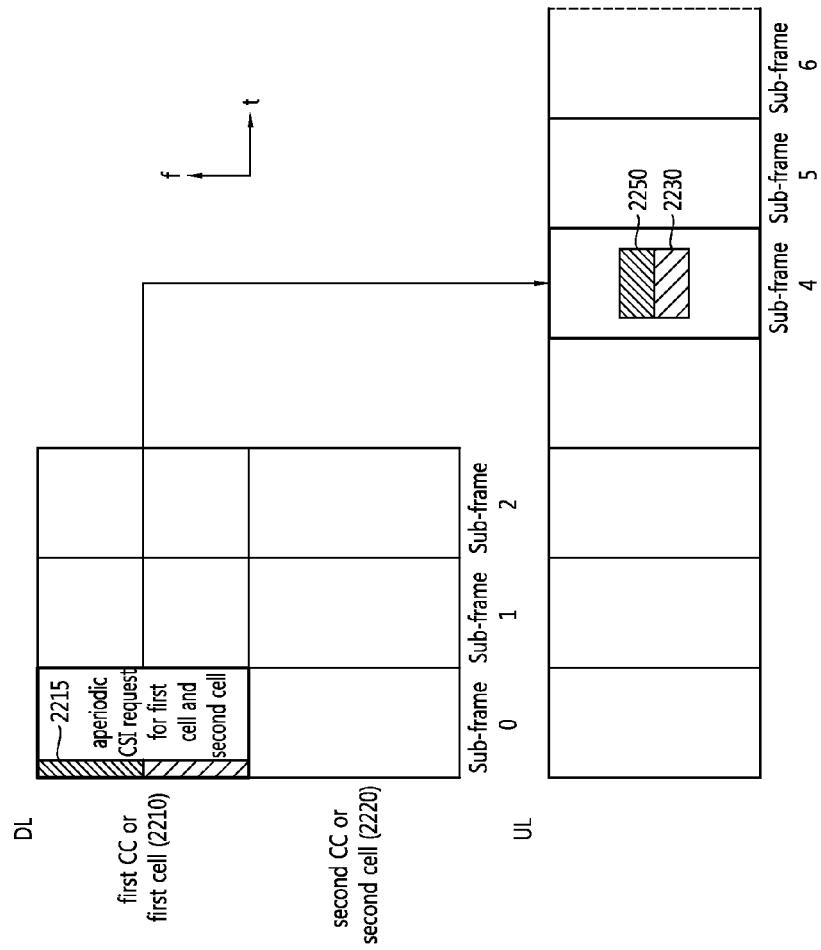
FIG. 22 is a concept view illustrating an aperiodic CSI feedback method according to an embodiment of the present invention.

FIG. 22 is a concept view illustrating an aperiodic CSI feedback method according to an embodiment of the present invention.

FIG. 22 illustrates an example in which a UE receives a downlink control signal including a CSI request for a plurality of CCs.

An aperiodic CSI feedback request for a plurality of carrier-aggregated cells may be sent to the UE. In such case, the UE may generate a PUSCH reference signal so that the plurality of cells each may receive aperiodic CSI feedback information, and the UE may transmit the PUSCH reference signal to the base station. For example, the UE may generate a PUSCH reference signal based on a replacement cell identifier, e.g., a virtual cell identifier configured by a higher layer, instead of a physical cell identifier, and the UE may transmit the PUSCH reference signal to the base station.

Referring to FIG. 22, for example, in case the first cell 2210 and the second cell 2220 have been carrier-aggregated, the first cell 2210 may send an aperiodic CSI feedback request 2215 for the first cell 2220 to the UE. When receiving the aperiodic CSI feedback request 2215 for the first cell 2210 and the second cell 2220 from the first cell 2210, the UE may generate a PUSCH reference signal 2250 based on the aperiodic CSI feedback information for the first cell and the virtual cell identifier of the first cell and a PUSCH reference signal 2230 based on the aperiodic CSI feedback information for the second cell and the virtual cell identifier of the second cell, and the UE may transmit the PUSCH reference signal 2250 and the PUSCH reference signal 2230 through an uplink channel. When receiving the signals through the uplink channel, the first cell 2210 may decode the aperiodic CSI feedback information 2250 for the first cell 2210 based on the PUSCH reference signal generated based on the virtual cell identifier of the first cell 2210. When receiving the signals through the uplink channel, the second cell 2220 may decode the aperiodic CSI feedback information 2230 for the second cell 2220 based on the PUSCH reference signal generated based on the virtual cell identifier of the second cell 2220.

As another example, the UE may transmit, to the first cell and the second cell, the reference signals generated based on the aperiodic CSI feedback information for the first cell and the aperiodic CSI feedback information for the second cell and the virtual cell identifiers for demodulating the aperiodic CSI feedback information for the first cell and the aperiodic CSI feedback information for the second cell. The first cell and the second cell may obtain the aperiodic CSI feedback information for the first cell and the aperiodic CSI feedback information for the second cell based on the reference signals generated based on the virtual cell identifiers and by demodulating the aperiodic CSI feedback information for the first cell.

According to an embodiment of the present invention, the operation of the base station may be limited to requesting an aperiodic CSI for only one cell without granting simultaneous aperiodic CSI feedback for a plurality of cells.

In case a cell transmitting information on PUSCH scheduling is configured by a higher layer and the scheduling information is difficult to share, a request for aperiodic CSI feedback may be transmitted, with the request included in a downlink control signal transmitting the PDSCH scheduling information. In case the request for aperiodic CSI feedback is included in the downlink control signal transmitting the PDSCH scheduling information, the UE may perform the following operations.

Figure 23:
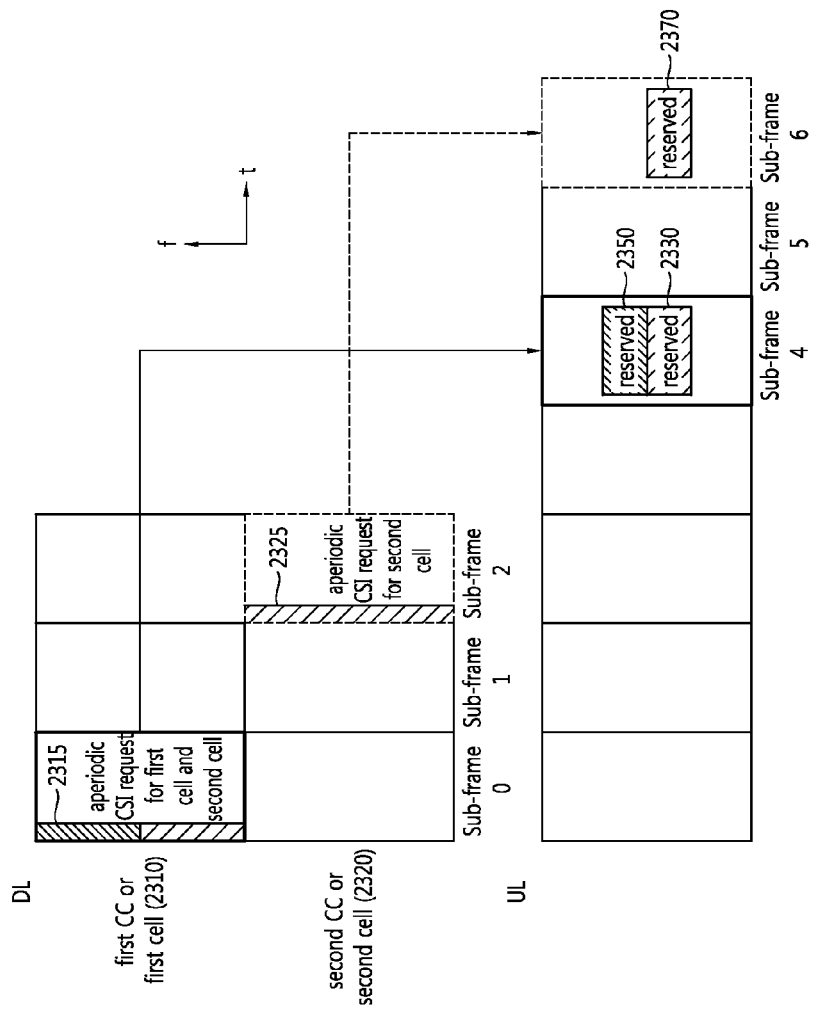
FIG. 23 is a concept view illustrating an aperiodic CSI feedback method according to an embodiment of the present invention.

FIG. 23 is a concept view illustrating an aperiodic CSI feedback method according to an embodiment of the present invention.

FIG. 23 illustrates the operation of a UE when a request for aperiodic CSI feedback is included in a downlink control signal transmitting PDSCH scheduling information.

Referring to FIG. 23, in case an aperiodic CSI feedback request is included in a downlink control signal transmitting PDSCH scheduling information, resources 2350, 2330, and 2370 for the UE to transmit the aperiodic CSI feedback may be previously reserved. For example, among RBs available for uplink PUSCH transmission, some 2350, 2330, and 2370 may be reserved for aperiodic CSI feedback transmission. Whether to use resources for transmitting aperiodic CSI feedbacks and information regarding the resources reserved for aperiodic CSI feedback transmission may be transmitted to the UE based on dynamic signaling or higher layer signaling.

When the first cell 2310 and the second cell 2320 have been carrier-aggregated, the UE may receive a request 2325 for aperiodic CSI feedback for one of the plurality of cells. In such case, the UE may generate a PUSCH reference signal based on the physical cell identifier of the cell targeted for aperiodic CSI feedback, and the UE may transmit an aperiodic CSI feedback and the PUSCH reference signal 2370 to the base station. The base station may demodulate the CSI feedback information 2370 received through the PUSCH based on the received PUSCH reference signal.

The UE may receive a request 2315 for aperiodic CSI feedbacks for the first cell 2310 and the second cell 2320. In such case, the aperiodic CSI feedback 2350 for the first cell and the aperiodic CSI feedback 2370 for the second cell included in the PUSCH transmitted from the UE should be respectively received by the base station of the first cell 2310 and the base station of the second cell 2320. Accordingly, the UE may generate a PUSCH reference signal based on replacement values, e.g., virtual cell identifiers, for distinguishing the first cell 2310 from the second cell 2320, as configured by a higher layer, instead of the respective physical cell identifiers of the first cell 2310 and the second cell 2320, and the UE may transmit aperiodic CSI feedbacks.

When receiving the aperiodic CSI feedback request for the first cell 2310 and the second cell 2320, the UE may generate a PUSCH reference signal 2350 based on the aperiodic CSI feedback information for the first cell 2310 and the virtual cell identifier of the first cell and a PUSCH reference signal 2330 based on the aperiodic CSI feedback information for the second cell and the virtual cell identifier of the second cell, and the UE may transmit the PUSCH reference signal 2350 and the PUSCH reference signal 2330 through an uplink channel. When receiving the signals through the uplink channel, the first cell 2310 may decode the aperiodic CSI feedback information 2350 for the first cell 2310 based on the PUSCH reference signal generated based on the virtual cell identifier of the first cell. When receiving the signals through the uplink channel, the second cell 2320 may decode the aperiodic CSI feedback information 2330 for the second cell 2320 based on the PUSCH reference signal generated based on the virtual cell identifier of the second cell.

That is, the base station of each cell may obtain aperiodic CSI feedback information for its cell based on the virtual cell identifier.

As another method, a plurality of cells may be not allowed to simultaneously send aperiodic CSI feedback requests to the UE. Assuming that PDSCH scheduling information is difficult for the plurality of cells to share, the respective aperiodic CSI feedback requests of the cells may overlap each other. In this case, only the aperiodic CSI feedback request of one cell may be transmitted according to an order of priority set by a higher layer. In such case, the UE may generate a PUSCH reference signal using the physical cell identifier of the cell that has requested the aperiodic CSI feedback, and the UE may transmit the PUSCH reference signal to the base station. The base station may obtain the aperiodic CSI feedback information based on the received PUSCH reference signal.

Now described is a method for controlling uplink power by a UE according to power control commands transmitted from a plurality of CCs. The UE may receive scheduling information for a PUSCH from a cell. The UE may transmit uplink data to the cell that has transmitted the scheduling information for the PUSCH through an uplink channel that has been subjected to power control. The UE may transmit an aperiodic CSI feedback to the cell targeted for aperiodic CSI feedback.

Each cell may receive an ACK/NACK and a periodic CSI transmitted through a PUCCH. Accordingly, power control on the PUCCH may be independently performed on each of both cells. The UE may transmit an SRS that may be received by each cell in order for independent PUCCH power control on both cells. The UE may control transmit power of an uplink channel by configuring an independent power control loop on each cell. A specific uplink power control method is now described.

Figure 24:
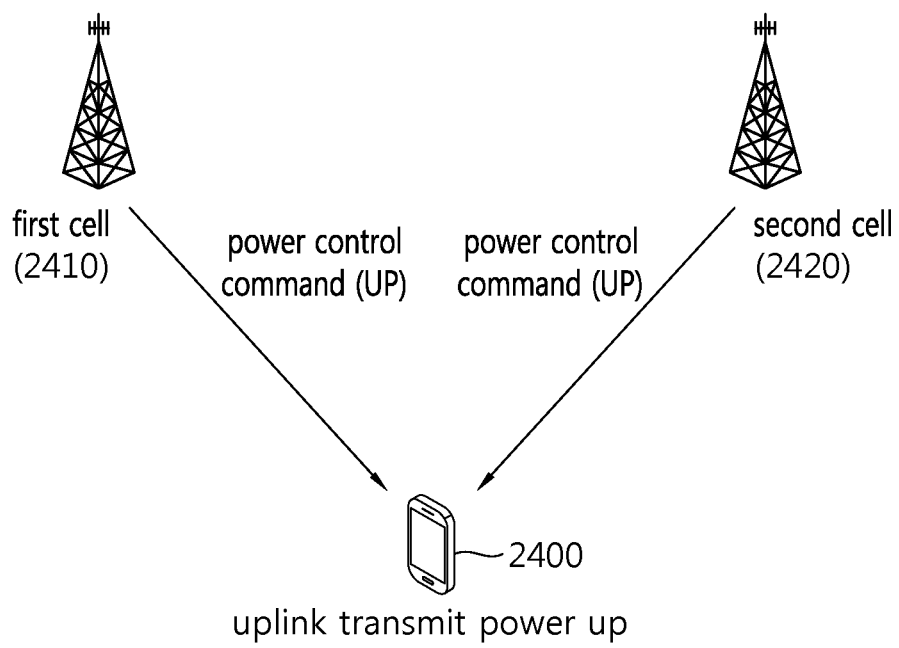
FIG. 24 is a concept view illustrating a power control method by a UE according to an embodiment of the present invention.

FIG. 24 is a concept view illustrating a power control method by a UE according to an embodiment of the present invention.

FIG. 24 illustrates a PUCCH power control combining method.

Referring to FIG. 24, a plurality of cells 2410 and 2420 may simultaneously transmit PDSCHs to the UE 2400. In this case, the UE 2400 may receive commands for PUCCH power control from the plurality of cells 2410 and 2420. The PUCCH transmit power adjustment by the UE 2400 may be conducted as follows.

The UE's PUCCH transmit power adjustment may be carried out based on 'OR-DOWN-law(=AND-UP-law).' Applying OR-DOWN-law, in case the PUCCH power control commands respectively received by the UE from the plurality of cells 2410 and 2420, both, indicate 'up,' the UE may increase the transmit power of uplink channel. In contrast, when at least one of the PUCCH power control commands received from the plurality of cells indicate 'down,' the UE 2400 may reduce the transmit power of uplink channel. Such scheme may effectively reduce the transmit power of the UE 2400. For example, in case the power control command transmitted from the first cell 2410 is 'UP,' and the power control command transmitted from the second cell 2420 is 'UP,' the UE 2400 may increase the uplink transmit power.

Figure 25:
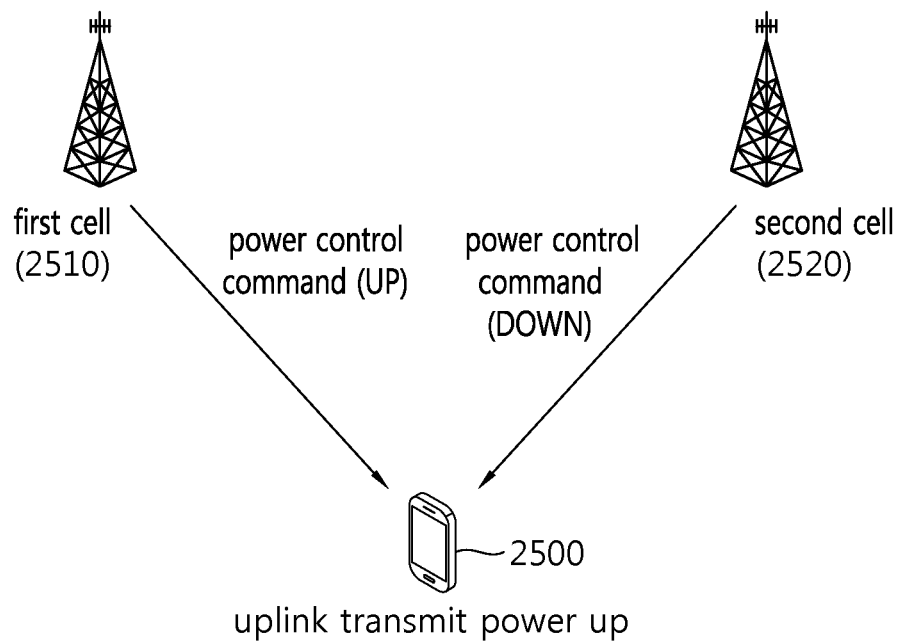
FIG. 25 is a concept view illustrating a power control method by a UE according to an embodiment of the present invention.

FIG. 25 is a concept view illustrating a power control method by a UE according to an embodiment of the present invention.

FIG. 25 illustrates a PUCCH power control combining method.

Referring to FIG. 25, a plurality of cells 2510 and 2520 may simultaneously transmit PDSCHs to the UE 2500. In this case, the UE 2500 may receive commands for PUCCH power control from the plurality of cells 2510 and 2520. The PUCCH transmit power adjustment by the UE 2500 may be conducted as follows.

The UE's PUCCH transmit power adjustment may be carried out based on 'OR-UP-law(=AND-DOWN-law).' In case at least one of the PUCCH power control commands respectively received by the UE from the plurality of cells 2510 and 2520 indicates 'up,' the UE 2500 may increase the transmit power of uplink channel. In contrast, when the PUCCH power control commands received from the plurality of cells, both, indicate 'down,' the UE 2500 may reduce the transmit power of uplink channel. Use of such scheme may enhance the PUCCH reception performance of the cells 2510 and 2520.

Figure 26:
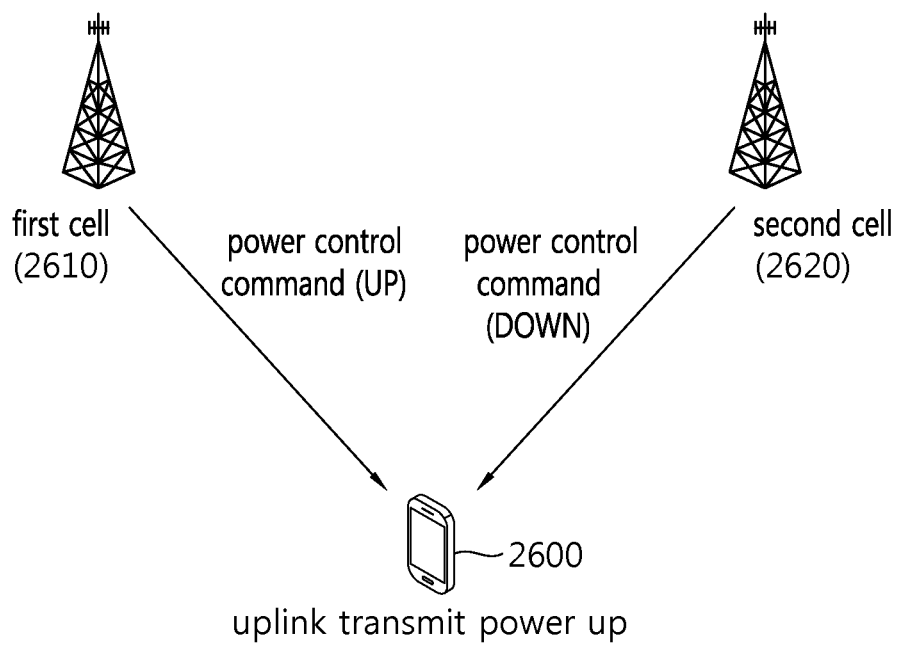
FIG. 26 is a concept view illustrating a power control method by a UE according to an embodiment of the present invention.

FIG. 26 is a concept view illustrating a power control method by a UE according to an embodiment of the present invention.

FIG. 26 illustrates a PUCCH power control combining method.

Referring to FIG. 26, a plurality of cells 2610 and 2620 may simultaneously transmit PDSCHs to the UE 2600. In this case, the UE 2600 may receive commands for PUCCH power control from the plurality of cells 2610 and 2620. The PUCCH transmit power adjustment by the UE 2600 may be conducted as follows.

The UE 2600 may conduct PUCCH power control based only on the PUCCH power control command transmitted from one cell 2610 among the PUCCH power control commands transmitted from the plurality of cells 2610 and 2620. For example, the UE 2600 may perform power control on the PUCCH according to the PUCCH power control command transmitted from the primary cell 2610.

According to an embodiment of the present invention, the UE might not use closed loop power control. The UE may adjust transmit power using only open loop power control while disregarding the PUCCH power control commands transmitted from the plurality of cells. Using an open loop power control scheme, the UE may adjust its output signal by measuring the strength of a signal transmitted from the base station.

Now described is a method for determining the size of a PUCCH format transmitted from a UE according to an embodiment of the present invention.

In case the UE receives PDSCHs from a plurality of cells, the UE may be aware of the number of ACKs/NACKs to be transmitted in response to the PDSCHs. However, in case the plurality of cells do not share the scheduling information, each cell cannot be aware of the total number of ACKs/NACKs transmitted by the UE. According to an embodiment of the present invention, the UE may transmit ACK/NACK information to each cell using a predetermined ACK/NACK payload format. For example, the UE may transmit an ACK/NACK based on an ACK/NACK payload format predetermined as per transmission mode. That is, none of the plurality of cells may get information about the size of the entire ACK/NACK payload transmitted from the UE, and the cells may set up transmit power in compliance with the predetermined size of ACK/NACK payload in order to maintain the decoding performance of the cells. The size of a PUCCH format is now described.

An FDD system, in case of PUCCH format 1b with channel selection and PUCCH format 3, may have an ACK/NACK payload size as computed in the following Equation 5.

$$n_{HARQ} = \Sigma_{c=0}^{Ncells^{DL}} n_c^{ACK} \qquad \text{<Equation 5>}$$

where, $n_{HARQ}$ is an ACK/NACK payload size, $N_{cells}^{DL}$ the number of configured cells, $n_c^{ACK}$ a parameter determined as per cell transmission mode. In case of supporting a PDSCH transmitting two transport blocks, $n_c^{ACK}=2$, and in case of supporting PDSCH transmitting 1 transport blocks, $n_c^{ACK}=1$.

An ACK/NACK signal for downlink data may be mapped with a PUCCH and may be then transmitted. PUCCH formats transmitting an ACK/NACK signal for downlink data include PUCCH format 1a/1b. PUCCH format 1b with channel selection may transmit an ACK/NACK signal of two to four bits to the base station. PUCCH format 1b with channel selection may assign an ACK/NACK for downlink data based on a channel selection table. As shown in Table 6 above, the channel selection table may map ACK/NACK signals with the PUCCH resources and symbols for use in transmission. The channel selection table may be configured of combinations of a plurality of resource indexes and modulated symbols of ACK/NACK signals in consideration of the number (M) of bits to be used to transmit the ACK/NACK signals. Up to four bits of resources necessary for signal transmission may be allocated through channel selection. For ACK/NACK signals of four bits or less, the table is configured according to the number (M) of bits necessary to transmit the ACK/NACK signals, and the table may be used for allocation of ACK/NACK resources. The channel selection table format may be previously delivered to the UE and the base station by higher layer signaling.

A TDD system, in case PUCCH format 1b with channel selection and PUCCH format 3 and DL-UL configuration 0, may have an ACK/NACK payload size as computed in the following Equation 6.

$$n_{HARQ} = \Sigma_{c=0}^{Ncells^{DL}} \Sigma_{k \in K} n_c^{ACK} \qquad \text{<Equation 6>}$$

where, $n_c^{ACK}$ may be a parameter determined as per the transmission mode of the serving cell. In case of supporting a PDSCH transmitting two transport blocks, $n_c^{ACK}=2$, and in case of supporting a PDSCH transmitting one transport block, $n_c^{ACK}=1$.

K may denote a downlink combination set determined according to uplink/downlink configurations and sub-frame index n in the TDD system as shown in the following Table 18. Downlink combination set K may contain information regarding the downlink sub-frame corresponding to the ACK/NACK transmitted through a sub-frame with sub-frame index n in a specific uplink/downlink configuration.

TABLE 18

| UL/DL Configuration | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

M contains information about the number of elements included in downlink combination set K determined as per the uplink/downlink configurations and sub-frame index n, and k may be an element of downlink combination set K.

$n_{HARQ}$ may be the ACK/NACK payload size, $N_{cells}^{DL}$ is the number of serving cells, and $n_c^{ACK}$ a parameter determined as per cell transmission mode. In case the serving cell is supportive of two transport blocks, $n_c^{ACK}$ is two, and in case supportive of one transport block, $n_c^{ACK}$ may be one.

A TDD system, in case of PUCCH format 1b with channel selection M=2 and PUCCH format 3 and DL-UL configuration 1-6, may have an ACK/NACK payload size as computed in the following Equation 7.

$$n_{HARQ} = \Sigma_{c=0}^{Ncells^{DL}} ((V_{DAI,c}^{DL} - U_{DAI,c}) \bmod 4) n_c^{ACK} \Sigma_{k \in K} n_c^{ACK} \qquad \text{<Equation 7>}$$

K may denote a downlink combination set determined according to uplink/downlink configurations and sub-frame index n in the TDD system as shown in Table 18 above. Downlink combination set K may contain information regarding the downlink sub-frame corresponding to the ACK/NACK transmitted through a sub-frame with sub-frame index n in a specific uplink/downlink configuration.

M contains information about the number of elements included in downlink combination set K determined as per the uplink/downlink configurations and sub-frame index n, and k may be an element of downlink combination set K.

$n_{HARQ}$ may be the ACK/NACK payload size, and $N_{cells}^{DL}$ is the number of serving cells.

$V_{DAI,c}^{DL}$ may be a DAI value indicated by a downlink control channel in serving cell c, $U_{DAI,c}$ the number of downlink component carriers actually received by the UE up to sub-frame n-k of serving cell c, $n_c^{ACK}$ a parameter determined according to the serving cell's transmission mode, wherein in case of supporting a PDSCH transmitting two transport blocks, $n_c^{ACK}=2$, and in case supporting a PDSCH transmitting one transport block, $n_c^{ACK}=1$.

Now described is a method for transmitting an SRS by a UE according to an embodiment of the present invention.

The UE may configure SRSs separately for a plurality of cells in order to receive, from the plurality of cells, a PUSCH transmitting an aperiodic CSI feedback and a PUCCH transmitting an ACK/NACK and/or a periodic CSI feedback. The UE may generate an SRS for each cell based on the physical cell identifier of the cell and transmit the SRS to the cell. Information determined based on a physical cell identifier to generate an SRS may include, e.g., information regarding a base sequence, a cyclic shift, a frequency combination, or an SRS sub-frame.

The UE may transmit the SRS generated based on the information for transmitting the SRS to the base station. In case the UE's uplink resources for the SRSs to be transmitted to two cells overlap each other, the UE may transmit the SRS for the cell with a higher priority, but not for the cell with a lower priority.

In case the UE is allowed to simultaneously transmit SRS and ACK/NACK, an ACK/NACK may be transmitted based on shortened PUCCH format 1a/1b or shortened PUCCH format 3. In case one of the two cells is a primary cell and the other is a secondary cell, the secondary cell as well as the primary cell may transmit an ACK/NACK based on shortened PUCCH format 1a/1b and shortened PUCCH format 3.

According to another embodiment of the present invention, the UE may generate and transmit an SRS using a replacement cell identifier, such as a virtual cell identifier, as configured by a higher layer instead of the physical cell identifier so as to enable the plurality of cells to simultaneously receive the SRS.

According to an embodiment of the present invention, a cell receiving a PUCCH may differ from a cell receiving a PUSCH. If the UE is not configured with simultaneous transmission of PUCCH/PUSCH, the UE may conduct PUCCH transmission only, but not PUSCH transmission. The UE may selectively select PUSCH or PUCCH depending on information transmitted through a PUCCH. For example, in case the information transmitted through the PUCCH is an ACK/NACK, the UE may transmit a PUCCH, but not PUSCH. As another example, if the information transmitted through the PUCCH is a periodic CSI, the UE may transmit a PUSCH, but not PUCCH.

Figure 27:
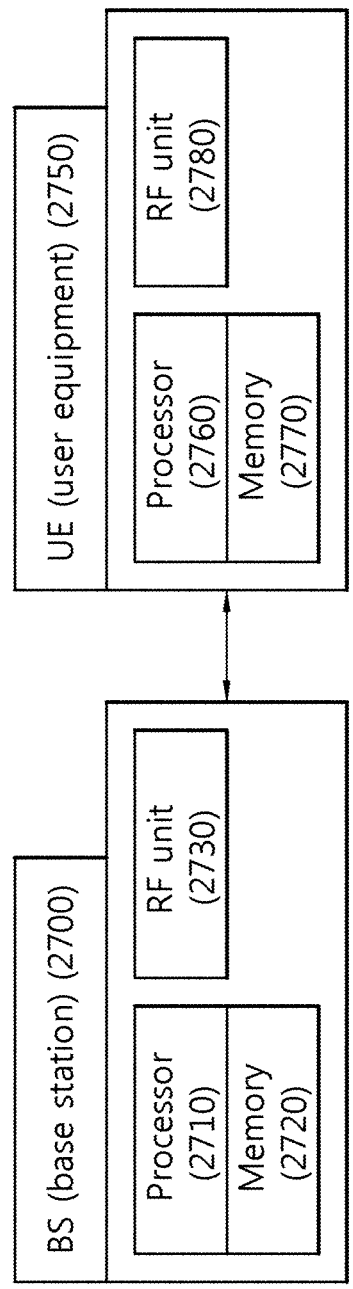
FIG. 27 is a block diagram illustrating a wireless communication system according to an embodiment of the present invention.

FIG. 27 is a block diagram showing a wireless communication system according to an embodiment of the present invention.

Referring to FIG. 27, a BS 2700 includes a processor 2710, a memory 2720 and a RF unit 2730. The memory 2720 is connected to the processor 2710 and configured to store various information used for the operations for the processor 2710. The RF unit 2730 is connected to the processor 2710 and configured to transmit and/or receive a radio signal. The processor 2710 implements the proposed functions, processed, and/or methods. In the described embodiments, the operation of BS may be implemented by the processor 2710.

For example, the processor 2710 may be implemented to obtain the data transmitted from the UE to the base station through an uplink sub-frame, based on the identifier of the base station (or the cell).

A user equipment 2750 includes a processor 2760, a memory 2770 and a RF unit 2780. The memory 2770 is connected to the processor 2760 and configured to store various information used for the operations for the processor 2760. The RF unit 2780 is connected to the processor 2760 and configured to transmit and/or receive a radio signal. The processor 2760 implements the proposed functions, processed, and/or methods. In the described embodiments, the operation of the user equipment may be implemented by the processor 2760.

For example, the processor 2760 may be implemented so that the UE receives first downlink data from a first cell through a first sub-frame, the UE receives second downlink data from a second cell through the first sub-frame, the UE transmits, through a second sub-frame, first uplink data generated based on a first identifier for the first cell in response to the first downlink data, and the UE transmits, through the second sub-frame, second uplink data generated based on a second identifier for the second cell in response to the second downlink data. The first cell and the second cell are cells that have conducted carrier aggregation. The second cell may be activated by the first cell. The first identifier may be a virtual cell identifier of the first cell configured by a higher layer, and the second identifier may be a virtual cell identifier of the second cell configured by the higher layer.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for an uplink transmission comprising:
    receiving, by an user equipment (UE), first downlink data from a first cell via a first subframe;
    receiving, by the UE, second downlink data from a second cell via the first subframe;
    transmitting, by the UE to the first cell, via a second subframe, first uplink data generated based on a first identifier of the first cell in response to the first downlink data; and
    transmitting, by the UE to the second cell, via the second subframe, second uplink data generated based on a second identifier of the second cell in response to the second downlink data,
    wherein the first uplink data includes first acknowledgement/non-acknowledgement (ACK/NACK) information in response to the first downlink data,
    wherein the second uplink data includes second ACK/NACK information in response to the second downlink data, wherein a number of the first ACK/NACK information included in the first uplink data is determined based on a downlink transmission mode of the first cell, and wherein a number of the second ACK/NACK information included in the second uplink data is determined based on a downlink transmission mode of the second cell.

2. The method of claim 1,
wherein the first downlink data is a first physical downlink shared channel (PDSCH), and
wherein the second downlink data is a second PDSCH.

3. The method of claim 1,
wherein the first ACK/NACK information is included at a predetermined position of a ACK/NACK payload in the first uplink data, and
wherein the second ACK/NACK information is included at a predetermined position of a ACK/NACK payload in the second uplink data.

4. The method of claim 1,
wherein the first downlink data includes a first aperiodic CSI feedback request,
wherein the second downlink data includes a second aperiodic CSI feedback request,
wherein the first uplink data includes a first aperiodic CSI feedback and a first reference signal,
wherein the second uplink data includes a second aperiodic CSI feedback and a second reference signal,
wherein the first downlink data and the second downlink data are transmitted based on a physical downlink control channel (PDCCH) or an enhanced physical downlink control channel (EPDCCH),
wherein the first aperiodic CSI feedback and the first reference signal are determined based on the first identifier, and
wherein the second aperiodic CSI feedback and the second reference signal are determined based on the second identifier.

5. The method of claim 4, wherein a resource where the first aperiodic CSI feedback and the second aperiodic CSI feedback is previously reserved.

6. The method of claim 1,
wherein the first identifier of the first cell is configured by a higher layer, and
wherein the second identifier of the second cell is configured by the higher layer.

7. The method of claim 1, further comprising:
if the first downlink data is not scheduled by the first cell, assuming that the first ACK/NACK information corresponds to a NACK, and
if the second downlink data is not scheduled by the second cell, assuming that the second ACK/NACK information corresponds to a NACK.

8. A user equipment (UE) in a wireless communication system, the UE comprising:
a radio frequency (RF) unit configured to receive a radio signal; and
a processor operatively connected with the RF unit and configured to:
receive first downlink data from a first cell via a first subframe;
receive second downlink data from a second cell via the first subframe;
transmit, via a second subframe to the first cell, first uplink data generated based on a first identifier of the first cell in response to the first downlink data; and
transmit, via the second subframe to the second cell, second uplink data generated based on a second identifier of the second cell in response to the second downlink data,
wherein the first uplink data includes first acknowledgement/non-acknowledgement (ACK/NACK) information in response to the first downlink data,
wherein the second uplink data includes second ACK/NACK information in response to the second downlink data,
wherein a number of the first ACK/NACK information included in the first uplink data is determined based on a downlink transmission mode of the first cell, and
wherein a number of the second ACK/NACK information included in the second uplink data is determined based on a downlink transmission mode of the second cell.

9. The UE of claim 8,
wherein the first downlink data is a first physical downlink shared channel (PDSCH), and
wherein the second downlink data is a second PDSCH.

10. The UE of claim 8,
wherein the first ACK/NACK information is included at a predetermined position of a ACK/NACK payload in the first uplink data, and
wherein the second ACK/NACK information is included at a predetermined position of a ACK/NACK payload in the second uplink data.

11. The UE of claim 8,
wherein the first downlink data includes a first aperiodic CSI feedback request,
wherein the second downlink data includes a second aperiodic CSI feedback request,
wherein the first uplink data includes a first aperiodic CSI feedback and a first reference signal, and
wherein the second uplink data includes a second aperiodic CSI feedback and a second reference signal,
wherein the first downlink data and the second downlink data are transmitted based on a physical downlink control channel (PDCCH) or an enhanced physical downlink control channel (EPDCCH),
wherein the first aperiodic CSI feedback and the first reference signal are determined based on the first identifier, and
wherein the second aperiodic CSI feedback and the second reference signal are determined based on the second identifier.

12. The UE of claim 11, wherein a resource where the first aperiodic CSI feedback and the second aperiodic CSI feedback is previously reserved.

* * * * *